(12) United States Patent
Schultz et al.

(10) Patent No.: US 11,128,098 B2
(45) Date of Patent: Sep. 21, 2021

(54) CHARACTERIZING AN OPTICAL ELEMENT

(71) Applicant: Quantum-Si Incorporated, Guilford, CT (US)

(72) Inventors: Jonathan C. Schultz, Guilford, CT (US); Andrey V. Okishev, Guilford, CT (US); Craig Wenger, Long Beach Township, NJ (US); Brittany Lathrop, Derby, CT (US); Faisal R. Ahmad, Guilford, CT (US)

(73) Assignee: Quantum-Si Incorporated, Guilford, CT (US)

( * ) Notice: Subject to any disclaimer, the term of this patent is extended or adjusted under 35 U.S.C. 154(b) by 0 days.

(21) Appl. No.: 16/384,335

(22) Filed: Apr. 15, 2019

(65) Prior Publication Data

US 2019/0341736 A1  Nov. 7, 2019

Related U.S. Application Data

(60) Provisional application No. 62/666,677, filed on May 3, 2018.

(51) Int. Cl.
*H01S 3/11* (2006.01)
*G01J 11/00* (2006.01)
(Continued)

(52) U.S. Cl.
CPC ............ *H01S 3/1115* (2013.01); *G01J 11/00* (2013.01); *H01S 3/0014* (2013.01); *H01S 3/086* (2013.01); *H01S 3/08059* (2013.01); *H01S 3/105* (2013.01); *H01S 3/1611* (2013.01); *H01S 3/0405* (2013.01); *H01S 3/08072* (2013.01);
(Continued)

(58) Field of Classification Search
CPC .... G01J 11/00; H01S 3/0014; H01S 3/08059; H01S 3/1611; H01S 3/1643; H01S 3/0405; H01S 3/11; H01S 3/105; H01S 3/08

See application file for complete search history.

(56) References Cited

U.S. PATENT DOCUMENTS 5,862,162 A * 1/1999 Maeda ................. H01S 5/141
                                                              372/20
5,961,924 A  10/1999 Reichert et al.
(Continued)

FOREIGN PATENT DOCUMENTS

| EP | 2557641 A1 | 2/2013 |
|---|---|---|
| WO | WO 02/45219 A1 | 6/2002 |
| WO | WO 2011/153962 A1 | 12/2011 |

OTHER PUBLICATIONS

International Search Report and Written Opinion for International Application No. PCT/US2019/027534 dated Jul. 25, 2019.
(Continued)

*Primary Examiner* — Tuan N Nguyen
(74) *Attorney, Agent, or Firm* — Wolf, Greenfield & Sacks, P.C.

(57) ABSTRACT

A method and apparatus for characterizing an optical element. The optical element is part of a laser and is mounted on a translation stage to scan the optical element transverse to an intracavity laser beam. A performance characteristic of the laser is recorded as a function of position of the optical element.

39 Claims, 11 Drawing Sheets

(51) Int. Cl.
*H01S 3/00* (2006.01)
*H01S 3/08* (2006.01)
*H01S 3/086* (2006.01)
*H01S 3/105* (2006.01)
*H01S 3/16* (2006.01)
*H01S 3/04* (2006.01)

(52) U.S. Cl.
CPC ......... *H01S 3/08081* (2013.01); *H01S 3/1643* (2013.01); *H01S 3/1653* (2013.01); *H01S 3/1658* (2013.01); *H01S 3/1671* (2013.01); *H01S 3/1673* (2013.01)

(56) References Cited

U.S. PATENT DOCUMENTS

| | | | |
|---|---|---|---|
| 6,081,539 A * | 6/2000 | Mattori | H01S 5/141 |
| | | | 372/102 |
| 6,504,967 B1 * | 1/2003 | Zhou | B81C 1/00357 |
| | | | 385/18 |
| 6,787,308 B2 | 9/2004 | Balasubramanian et al. | |
| 6,917,726 B2 | 7/2005 | Levene et al. | |
| 6,980,572 B2 * | 12/2005 | Geske | H01S 5/423 |
| | | | 372/15 |
| 7,175,811 B2 | 2/2007 | Bach et al. | |
| 7,426,322 B2 | 9/2008 | Hyde | |
| 7,738,086 B2 | 6/2010 | Shepard et al. | |
| 7,820,983 B2 | 10/2010 | Lundquist et al. | |
| 7,834,329 B2 | 11/2010 | Lundquist et al. | |
| 7,838,847 B2 | 11/2010 | Lundquist et al. | |
| 8,053,742 B2 | 11/2011 | Lundquist et al. | |
| 8,207,509 B2 | 6/2012 | Lundquist et al. | |
| 8,274,040 B2 | 9/2012 | Zhong et al. | |
| 8,278,728 B2 | 10/2012 | Murshid | |
| 8,465,699 B2 | 6/2013 | Fehr et al. | |
| 8,471,219 B2 | 6/2013 | Lundquist et al. | |
| 8,471,230 B2 | 6/2013 | Zhong et al. | |
| 8,502,169 B2 | 8/2013 | Rigneault et al. | |
| 8,618,507 B1 | 12/2013 | Lundquist et al. | |
| 9,029,802 B2 | 5/2015 | Lundquist et al. | |
| 9,157,864 B2 | 10/2015 | Fehr et al. | |
| 9,222,123 B2 | 12/2015 | Zhong et al. | |
| 9,222,133 B2 | 12/2015 | Lundquist et al. | |
| 9,223,084 B2 | 12/2015 | Grot et al. | |
| 9,372,308 B1 | 6/2016 | Saxena et al. | |
| 9,587,276 B2 | 3/2017 | Lundquist et al. | |
| 9,606,060 B2 | 3/2017 | Chen et al. | |
| 9,658,161 B2 | 5/2017 | Saxena et al. | |
| 9,666,748 B2 | 5/2017 | Leobandung | |
| 9,719,138 B2 | 8/2017 | Zhong et al. | |
| 9,765,395 B2 | 9/2017 | Goldsmith | |
| 9,946,017 B2 | 4/2018 | Saxena et al. | |
| 10,018,764 B2 | 7/2018 | Grot et al. | |
| 10,090,429 B2 | 10/2018 | Leobandung | |
| 10,138,515 B2 | 11/2018 | Fehr et al. | |
| 10,280,457 B2 | 5/2019 | Zhong et al. | |
| 10,310,178 B2 | 6/2019 | Saxena et al. | |
| 10,487,356 B2 | 11/2019 | Lundquist et al. | |
| 10,578,788 B2 | 3/2020 | Grot et al. | |
| 10,655,172 B2 | 5/2020 | Rank et al. | |
| 2002/0154376 A1 * | 10/2002 | Vail | G02F 1/011 |
| | | | 359/238 |
| 2002/0182716 A1 | 12/2002 | Weisbuch et al. | |
| 2003/0174992 A1 | 9/2003 | Levene et al. | |
| 2003/0231664 A1 * | 12/2003 | Geske | H01S 5/423 |
| | | | 372/23 |
| 2007/0263681 A1 * | 11/2007 | Yoshitomi | H01S 3/10092 |
| | | | 372/25 |
| 2008/0192250 A1 * | 8/2008 | Yoo | B23K 26/082 |
| | | | 356/326 |
| 2010/0065726 A1 | 3/2010 | Zhong et al. | |
| 2011/0019705 A1 * | 1/2011 | Adams | H01S 3/13013 |
| | | | 372/25 |
| 2011/0170565 A1 | 7/2011 | Jiang et al. | |
| 2011/0249690 A1 * | 10/2011 | Sato | H01S 5/141 |
| | | | 372/20 |
| 2013/0116153 A1 | 5/2013 | Bowen et al. | |
| 2017/0146479 A1 | 5/2017 | Levine et al. | |
| 2019/0292590 A1 | 9/2019 | Zhong et al. | |

OTHER PUBLICATIONS

Hale, Fibre Optic Sensors using Adiabatically Tapered Single Mode Fibres. Dissertation submitted to the University of Cambridge. Feb. 1994. 209 pages.

Mogensen et al., A Microfluidic Device with an Integrated Waveguide Beam Splitter for Velocity Measurements of Flowing Particles by Fourier Transformation. Analytical Chemistry. Sep. 15, 2003;75(18):4931-4936.

Taitt et al., Evanescent wave fluorescence biosensors. Biosens Bioelectron. Jun. 2005;20(12):2470-87. Epub Dec. 8, 2004.

* cited by examiner

Power (532 nm), a.u.

3648

1849

50

Pulse width, ps 19.985

14.680

9.374

Autocorrelator output display

Running (Filter) (Average)
ACF: 25.006 ps
Pulse fit (Sech2): 15.291 ps
MSE: 5.777E-5

Autocorrelation function (ACF) is fit by Sech² function that corresponds to actual pulse width

CHARACTERIZING AN OPTICAL ELEMENT

RELATED APPLICATION

This Application claims priority under (35 USC 119(e)) of U.S. Application Ser. No. 62/666,677, filed May 3, 2018, entitled "CHARACTERIZING AN OPTICAL ELEMENT".

FIELD

The present application is directed to devices and methods for characterizing an optical element.

BACKGROUND

Optical elements, such as (but not limited to) mirrors, optically nonlinear crystals, saturable absorbers, nonlinear self-focusing optical elements, and beam-shaping components, are used in a variety of applications. There are particular applications, such as using an optical element to form a laser, that require very particular properties to ensure the laser performs as expected.

By way of example, a saturable absorber mirror (SAM) may be used as end mirror of a laser cavity. The SAM causes the laser to passively mode-lock, creating ultrashort laser pulses. Ultrashort optical pulses (i.e., optical pulses less than about 100 picoseconds) are useful in various areas of research and development as well as commercial applications involving time-domain analyses. For example, ultrashort optical pulses may be useful for time-domain spectroscopy, optical ranging, time-domain imaging (TDI), optical coherence tomography (OCT), fluorescent lifetime imaging (FLI), and lifetime-resolved fluorescent detection for genetic sequencing. Ultrashort pulses may also be useful for commercial applications including optical communication systems, medical applications, and testing of optoelectronic devices.

The above-noted applications typically have particular requirements for the ultrashort optical pulses to be effective in a given application. For example, the pulse duration (also referred to as temporal pulse width, or simply "pulse width") should be less than a threshold level for some applications and the optical power should be greater than a threshold level for some applications. The pulse duration and optical power of a laser is based, in large part, on the characteristics of the SAM. Thus, the SAM must be capable of producing sufficiently short pulses with large enough optical power to be useful in a particular application.

Additionally, when manufacturing a laser, a SAM should be selected that causes the laser to mode-lock at or below a specified pump power and mode-locks without unwanted laser behavior such as Q-switching. Mirrors and/or SAMs should also exhibit properties indicating longevity and a damage threshold that is higher than the operational power of the laser.

SUMMARY

The technology described herein relates to apparatus and methods for characterizing optical elements.

According to one aspect of the present application, an optical characterization apparatus is provided. The optical characterization apparatus includes a laser configured to generate a laser beam. The laser includes a first mirror and a second mirror. The second mirror is mounted on a two-dimensional translation stage configured to translate the second mirror in a first direction and second direction, wherein the first direction and second direction are perpendicular to a third direction defined by the propagation direction of the laser beam at the location of the second mirror. The first mirror and the second mirror define a laser cavity of the laser.

According to one aspect of the present application, an optical characterization apparatus is provided. The optical characterization apparatus includes a laser configured to generate an intracavity laser beam having a beam axis. The optical characterization apparatus also includes a positioning mount arranged to hold an optical element so that the optical element receives the intracavity laser beam and can move the optical element transverse to the axis.

According to one aspect of the present application, method of characterizing an optical element is provided. The method includes: scanning the optical element transvers to an intracavity laser beam having a beam axis; and recording a performance characteristic of the laser as a function of position of the scanned optical element.

The foregoing and other aspects, implementations, acts, functionalities, features and, embodiments of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of some embodiments may be shown exaggerated or enlarged to facilitate an understanding of the embodiment. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1:
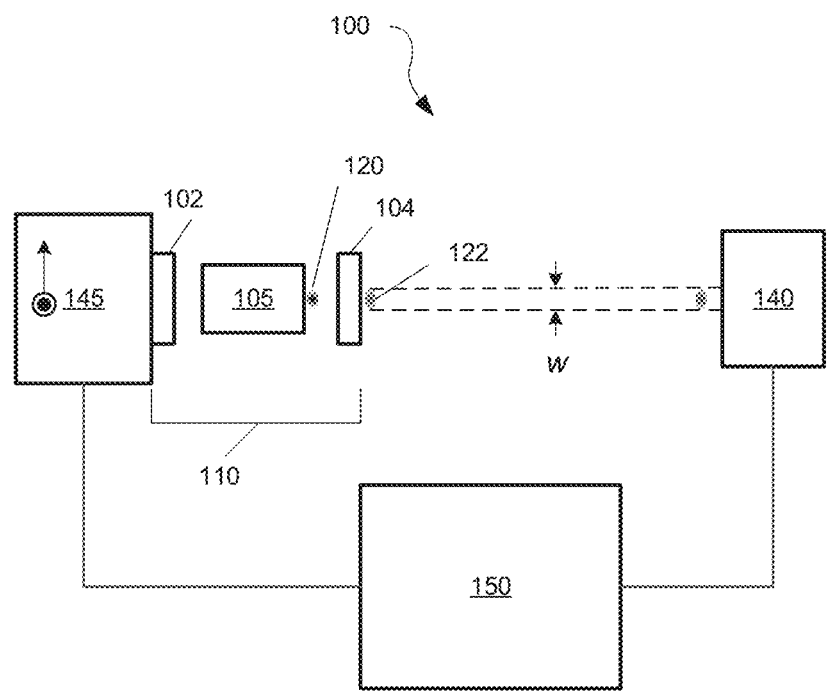
FIG. 1 is a block diagram of an optical characterization apparatus, according to some embodiments.

The features and advantages of the present application will become more apparent from the detailed description set forth below when taken in conjunction with the drawings. When describing embodiments in reference to the drawings, directional references ("above," "below," "top," "bottom," "left," "right," "horizontal," "vertical," etc.) may be used. Such references are intended merely as an aid to the reader viewing the drawings in a normal orientation. These directional references are not intended to describe a preferred or only orientation of an embodied device. A device may be embodied in other orientations.

DETAILED DESCRIPTION

Introduction

The inventors have recognized and appreciated that conventional techniques for characterizing optical elements do not sufficiently measure characteristics that are important for building a laser system for a particular application. For example, mirrors and saturable absorbers, e.g., saturable absorber mirrors (SAMs), are conventionally characterized by visual observation using microscopy and/or probing with an external laser system. While such techniques are able to measure certain properties of an optical element, the conventional techniques for characterizing an optical element measure properties that are indirectly related to the performance of a laser using said optical element and do not directly measure the characteristics that are important for building a laser system with particular properties. Accordingly, the inventors have conceived optical characterization techniques that provide information about an optical element that cannot be measured using conventional techniques.

By way of example, and not limitation, a SAM may be used as an end mirror of a laser cavity that generates ultrashort pulses of light. Conventionally, a SAM is characterized by visually inspecting the SAM under a microscope and/or probing the SAM using a separate laser system. For example, the reflectivity and/or absorption of the SAM in an unsaturated state may be measured using reflectometry of a laser beam. Additionally, the relaxation time of the SAM, e.g., how much time it takes for photoelectrons in the SAM to relax from the conduction band to the valence band, may be conventionally measured via a pump-probe technique using a pulsed laser system. The inventors recognized and appreciated that, while visual inspection, reflectivity and relaxation time may be useful properties of a SAM to quantify, ensuring those measurements meet certain conditions and/or criteria is not sufficient for determining that using the SAM in a laser system will meet expected performance criteria. For example, the conventional techniques provide some guidance to the surface quality of the SAM, but does not provide direct information about the mode-locking and power performance of a laser using said SAM.

The inventors recognized and appreciated that including the SAM in a laser system and measuring the properties of that laser system provides direct information about the performance of a laser that incorporates that particular SAM. In particular, the mode-locking performance (repetition rate, pump threshold, quality (e.g., no Q-switching)) and optical power of the laser can be directly measured. Any defects in the SAM will be evidenced by loss of power or poor mode-locking performance, allowing the manufacturer of a laser system to choose SAMs that are high quality and will meet the desired performance criteria for the laser system.

The inventors have further recognized and appreciated that an optical characterization technique that includes the optical element in a laser system is useful in characterizing optical elements other than SAMs. For example, mirrors may be characterized using such a system to ensure adequate output laser power and mode-locking performance. Including the optical elements to be characterized within a laser cavity, as opposed to the conventional approach of measuring features of the optical component by probing the optical element with the output of a separate and distinct laser system, may also provide additional sensitivity that is not possible using the conventional techniques. This additional sensitivity comes from the fact that the output laser beam characteristics of a laser system is a function of the quality and characteristics of the constituent components of the laser system. Increased sensitivity may be, in part, due to the optical feedback that is inherent in generating a coherent beam of light in the laser cavity. In addition to characterizing mirrors, nonlinear optical elements can be characterized within a laser cavity, where using an intra-cavity laser beam can provide additional information about the performance of the nonlinear optical element that would not be available using conventional techniques as well as increased sensitivity.

Furthermore, the inventors have recognized and appreciated that optical elements such as SAMs are not necessarily consistent across their surface. There are multiple possible defects in a SAM that may be responsible for loss of laser power, poor mode-locking performance, or catastrophic failure. Accordingly, some embodiments mount the SAM, or other optical element being characterized, on a two-dimensional translation stage that is configured to translate the SAM in a plane normal to the incident laser beam of the laser cavity. By using a two-dimensional translation stage, the illumination spot of the laser beam may be rastered over a portion or the entirety of the SAM. Thus, a two-dimensional map of the SAM may be created to show which portions of the SAM have defects that affect the performance of the laser system. In some examples, SAMs that have one or more large, unusable areas may be discarded or not included in the manufacture of a laser system. If the SAM has unusable areas that are small or localized to a small portion of the SAM, then the SAM may be included in a laser system as long as the SAM is positioned and arranged such that the illumination spot of the laser beam is incident upon a region of the SAM that is deemed usable (e.g., the laser system exhibits the necessary power and mode-locking capabilities when using the identified portion of the SAM).

The inventors have also recognized and appreciated that, in an optical element characterization apparatus, it may be useful for the optical element to be easily removed and replaced with another optical element so that multiple optical elements may be characterized efficiently. Accordingly, rather than having the optical element positioned within a housing of a laser system, the optical element is positioned outside of a laser housing. In some embodiments, the optical element may be oriented perpendicular to the plane of the laser system. For example, the laser cavity of the laser system may include a mirror that reflects the laser beam out of the housing in a direction perpendicular to the optics that define the laser cavity such that the laser beam is incident on the optical element being characterized. Positioning the optical element being characterized outside of the laser housing may have the additional advantage that the two-dimensional translation stage does not need to be fitted into the housing and the range of motion of the translation stage is not limited by the housing. By removing the constraints of having to fit the optical element and the translation stage in the housing it is possible to characterize larger optical elements that would otherwise be possible. For example, an entire SAM wafer of arbitrary size (e.g., one, two, three, four, or five-inch diameter wafers) may be characterized before dicing the wafer into individual components. By characterizing the wafer before dicing, poor quality portions of the SAM wafer may be discarded, saving time and effort that would conventionally be spent manufacturing the individual component that would ultimately be unusable in a completed laser system.

Various illustrative examples of techniques for characterizing optical elements and devices for characterizing optical elements, are described below. It should be appreciated, however, that embodiments are not limited to operating in accordance with any of the examples below, and that other embodiments are possible.

FIG. 1 depicts an example optical characterization apparatus 100 that includes, in some embodiments, an ultrashort pulsed laser 110, an optical detection system 140, a two-dimensional translation stage 145, and a controller 150. The ultrashort pulsed laser 110 includes a gain medium 105 (which may be a solid-state material is some embodiments), a pump source for exciting the gain medium (not shown), and at least two cavity end mirrors 102, 104 that define ends of an optical laser cavity. In some embodiments, there may be one or more additional optical elements in the laser cavity for purposes of beam shaping, wavelength selection, and/or pulse forming. When operating, the pulsed laser 110 may produce an ultrashort optical pulse 120 that circulates back-and-forth in the laser cavity between the cavity's end mirrors 102, 104 and through the gain medium 105. One of the cavity mirrors 104 may partially transmit a portion of the circulating pulse, so that a train of optical pulses 122 are emitted from the pulsed laser 110. In some embodiments, the end mirror 102 may be a SAM that allows the pulsed laser 110 to passively mode-lock. The emitted pulses may form a beam (indicated by the dashed lines) that is characterized by a beam waist w.

In some embodiments, the pulsed laser 110 may include a nonlinear optical element (not shown), such as a nonlinear crystal, for converting at least a portion of the pulse wavelength to a shorter wavelength via frequency doubling or a longer wavelength via parametric amplification. When such a frequency conversion occurs, the pulsed laser 110 may include a first beam comprising light of a first wavelength and a second beam comprising light of a second wavelength. For example, the gain medium 105 may lase at 1064 nm, creating pulses at 1064 nm. The 1064 nm pulses may be converted via second harmonic generation (SHG) to 532 nm pulses using a nonlinear crystal, such as KTP or BBO. Thus, the beam 122 may include both 1064 nm pulses and 532 nm pulses.

Figure 2:
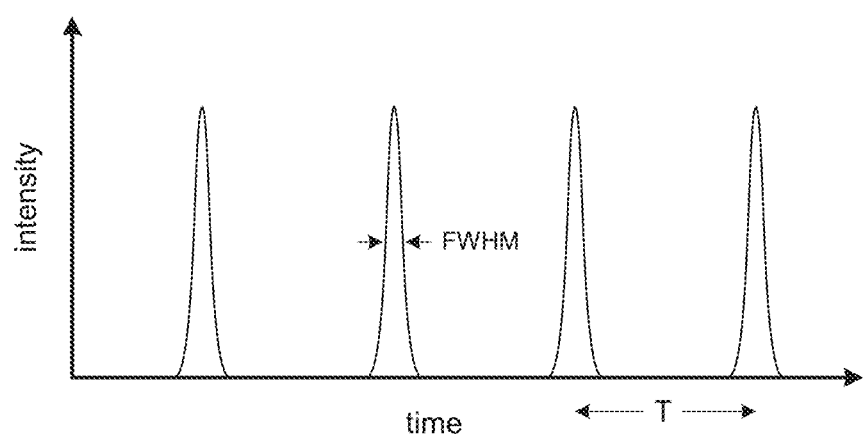
FIG. 2 depicts a train of pulses, according to some embodiments.

Measured temporal intensity profiles of the emitted pulses 122 may appear as depicted in FIG. 2. In some embodiments, the peak intensity values of the emitted pulses may be approximately equal, and the profiles may have a Gaussian temporal profile, though other profiles such as a $sech^2$ profile may be possible. In some cases, the pulses may not have symmetric temporal profiles and may have other temporal shapes. In some embodiments, gain and/or loss dynamics may yield pulses having asymmetric profiles. The duration of each pulse may be characterized by a full-width-half-maximum (FWHM) value, as indicated in FIG. 2. Ultrashort optical pulses may have FWHM values less than 100 picoseconds.

The pulses emitting from the laser may be separated by regular intervals T. In some embodiments, T may be determined by active gain and/or loss modulation rates in the laser. For mode-locked lasers, T may be determined by a round-trip travel time between the cavity end mirrors 102, 104. According to some embodiments, the pulse separation time T may be between about 1 ns and about 100 ns. In some cases, the pulse separation time T may be between about 0.1 ns and about 1 ns. In some implementations, the pulse separation time T may be between about 100 ns and about 2 µs.

Figure 3:
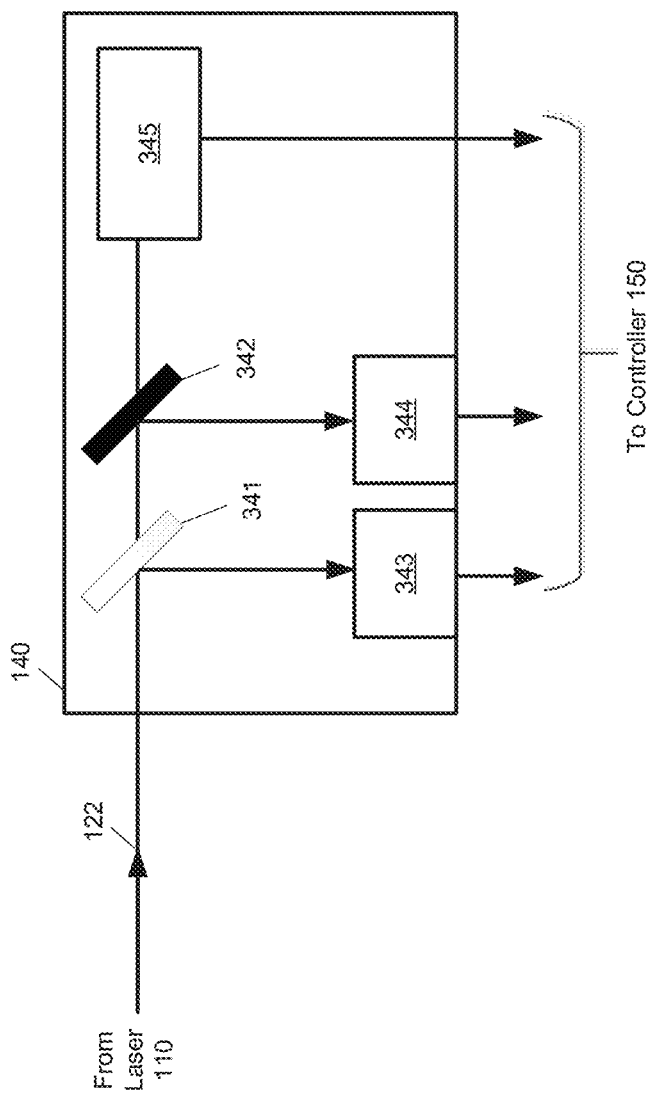
FIG. 3 is a schematic diagram of an optical detection system, according to some embodiments.

In some embodiments, the optical detection system 140 may receive a beam of pulses 122 from the laser 110 and detect one or more properties of the laser beam. Detection results from the optical detection system 140 are provided to the controller 150 for analysis. The optical detection system 140 may also include guiding optics to guide the laser beam to one of the various detectors. For example, FIG. 3 illustrates an example optical detection system 140 that includes, as an example of guiding optics, a dichroic mirror 341 and a beam splitter 342. The dichroic mirror 341 may reflect light of a first wavelength and transmit light of a second wavelength. For example, if the laser beam 122 includes both 1064 nm pulses and 532 nm pulses, the 1064 nm light may be reflected towards a first power meter 343 for measuring the power of the 1064 nm light. The beam splitter 342 may transmit a portion of the 532 nm light towards a second power meter 344 for measuring the power of the 532 nm light. The 532 nm light that transmits through the beam splitter 342 is directed to a pulse characterization detector 345. The pulse characterization detector 345 is configured to measure the pulse width of the 532 nm pulses output by the laser system 110. In some embodiments, the pulse characterization detector 345 may be an autocorrelator, such as the pulseCheck autocorrelator manufactured by APE. An autocorrelator measures the temporal pulse width of the laser pulses. In other embodiments, the pulse characterization detector 345 may include a device that performs spectral interferometry for direct electric field reconstruction (SPIDER) or frequency resolved optical gating (FROG), which can both provide not only the temporal pulse width of the laser pulses, but the full intensity and phase profile of the laser pulses. Detection results from each of the individual detectors of the optical detection system 140 are provided to the controller 150.

Embodiments are not limited to a particular optical detection system 140. For example, FIG. 1 illustrates the optical detection system 140 as being completely external to the laser system 110. In some embodiments, however, one or more detectors may be included within the laser system itself. For example, in embodiments where the laser cavity is formed from a plurality of internal mirrors, a detector may be placed behind one or more of the mirrors to detect a portion of the laser beam that transmits through the mirror. Such detectors may be positioned within a housing of the laser system to measure the power of the laser. In some embodiments, the optical detection system 140 may include a fast photodiode, which may be outside of the housing or inside the housing.

Referring back to FIG. 1, the optical characterization apparatus 100 may include a two-dimensional translation stage 145 configured to translate the end mirror 102 such that the illumination spot of the laser beam on the end mirror 102 may be scanned across the surface of the end mirror 102. Translating the end mirror 102 does not change the length of the laser cavity because the motion of the translation stage 102 is perpendicular to the incident optical pulse 122 of the laser beam. The arrows within the schematic depiction of the two-dimensional translation stage 145 of FIG. 1 show the two directions (up and down in the plane of the page and into and out of the page) the translation stage moved the end mirror 102 in the illustrated embodiment. In some embodiments, the two-dimensional translation stage 145 is a motorized translation stage controlled by the controller 150. In some embodiments the two-dimensional translation sage 145 may include a first one-dimensional translation stage mounted on a second one-dimensional translation stage with the direction of motion of the two translation stages being perpendicular to one another. In addition to the two-dimensional translation stage 145, some embodiments may include a two-axis tilt adjustment mount (not shown) to control the tilt of the end mirror 102. The tilt adjustment mount may use feedback from one or more power measurements to ensure the end mirror 102 is properly aligned to optimize performance of the pulsed laser 110.

As stated above, the optical characterization apparatus 100 includes a controller 150 for controlling the translation stage 145 and receiving measurement data from the optical detection system 140. As described in more detail below, the controller 150 may include a storage device and a processor. The storage device may store measurement data received from the optical detection system 140, as well as instructions that, when executed by the processor, cause the processor to analyze the measurement data. The instructions may further control the motion of the translation stage 145.

Embodiments are not limited to a specific optical layout of an optical characterization apparatus 100. In some embodiments, the optical characterization apparatus 100 has a similar layout as that of the laser system in which the optical element being characterized will ultimately be included. In such cases, it may be beneficial to ensure as many properties of the optical characterization apparatus 100 are the same as the laser system. For example, the length of the laser cavity may be the same in the optical characterization apparatus 100 and the laser system for which the optical element is intended. In some embodiments, the optical characterization apparatus 100 may be formed by modifying an existing laser system.

Mode-Locked Laser Module

Figure 4:
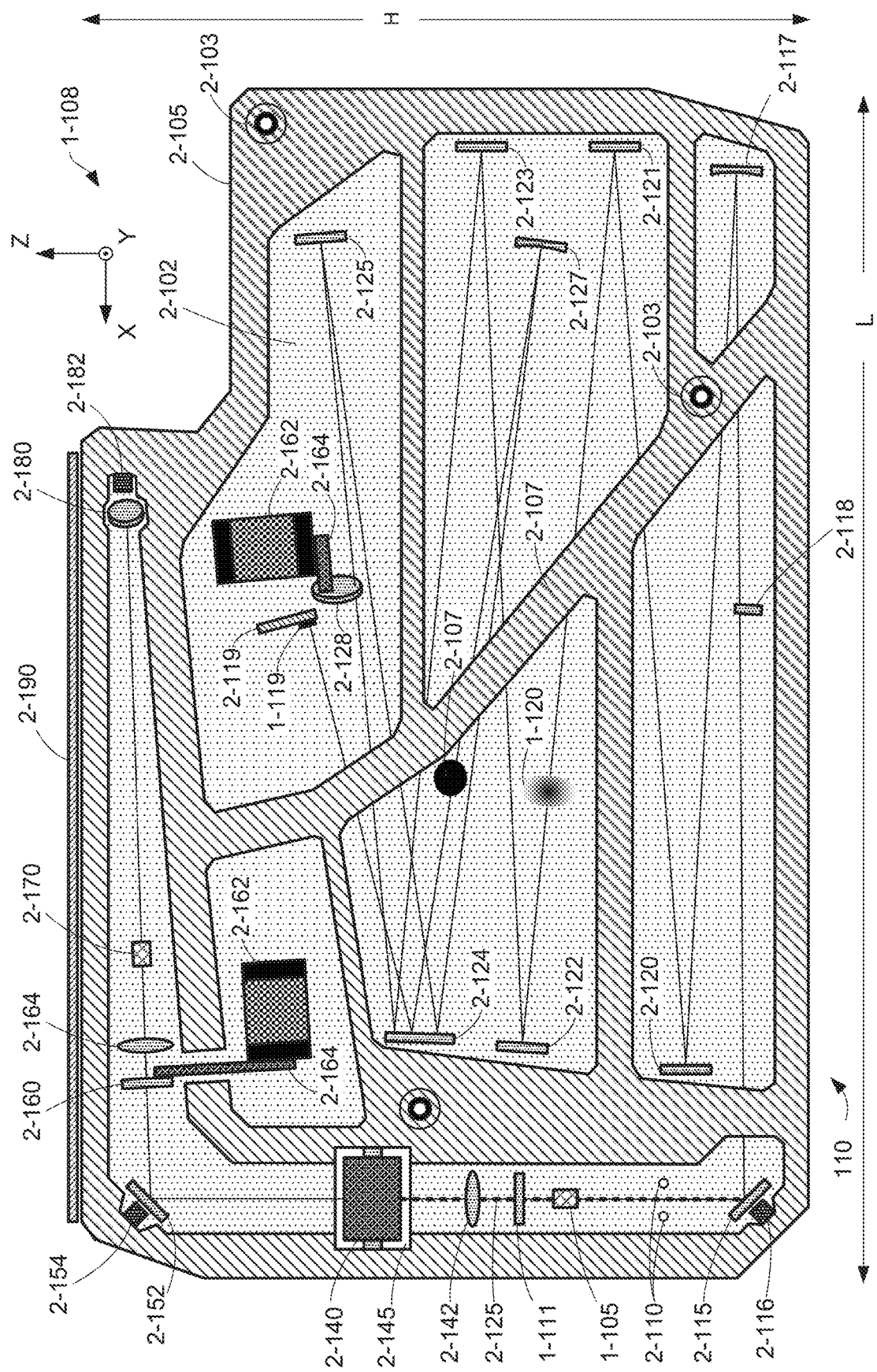
FIG. 4 is a schematic diagram of a pulsed laser, according to some embodiments.

Referring to FIG. 4, an example of a compact mode-locked laser module 1-108 that may be modified to form an optical characterization apparatus 100 is shown. The compact mode-locked laser module 1-108, according to some embodiments, can include a laser cavity (which includes optical elements between an output coupler 1-111 that can function as a first end mirror of the laser cavity and saturable absorber mirror (SAM) 1-119 that can function as a second end mirror of the laser cavity), a formed base chassis 2-105 (also referred to as a housing) on which some or all of the components of the mode-locked laser 110 are mounted, at least one intracavity optical element 2-128 that can stabilize operation of the mode-locked laser, frequency-doubling elements 2-170, 2-164, 2-160 that can participate in converting an output from the laser to a shorter wavelength, and electrical components 2-190, 2-154, 2-182, 2-116 that monitor operational parameters of the laser (such as optical power) and generate an electronic clock signal that is synchronized to the optical pulses produced by the laser. A pump module 2-140 can be mounted to the base chassis 2-105 and used to excite the gain medium 1-105 of the mode-locked laser.

The base chassis 2-105 of a compact mode-locked laser module 1-108 may measure between about 20 cm and about 30 cm in length L, between about 10 cm and about 20 cm in height H, and has a thickness between about 10 mm and about 30 mm, according to some embodiments. In some cases, one or more of the dimensions can be up to 20% larger. According to some embodiments, a volume occupied by the compact, mode-locked laser module 1-108 can be about 30 cm×18 cm×3 cm or approximately 1620 cm$^3$. According to some implementations, the overall shape or form factor of the mode-locked laser module 1-108 is a slab having a length L longer than a height H and a thickness much less than either the length or height, occupying a volume less than 2850 cubic cm and weighing less than, or has a weight of, approximately, 2 kilograms. In some cases, the weight of the module 1-108 is between 1 kilogram and 2 kilograms.

In some embodiments, the base chassis 2-105 can be formed from aluminum, titanium, an alloy of aluminum, or an alloy of titanium. Other materials can be used in other embodiments. In some implementations, the base chassis 2-105 can include a plurality of cavities 2-102 that are machined or otherwise formed (e.g., by casting or assembly) into the base chassis. In some embodiments, 12.5 mm-diameter optical components (or smaller) can be used to construct the mode-locked laser 110 and be partially or fully recessed into the cavities 2-102 of the base chassis 2-105, so that a cover (not shown) can be placed over the cavities 2-102 to protect the components within the cavities from outside environmental factors and contaminants. In some embodiments, a cover can be placed over the cavities 2-102 to hermetically seal one or more of the cavities.

Between the cavities 2-102, there can be ribs 2-107 formed in the base chassis 2-105. In some of the ribs, there can be holes or openings (not visible) that allow the intracavity laser beam to pass through the ribs to adjacent cavities. According to some embodiments, there can be one or more diagonal ribs 2-107 that run at an angle with respect to an edge of the base chassis 2-105. For example, a diagonal rib 2-107 can run in a corner-to-corner direction across the base chassis 2-105. The diagonal rib 2-107 can increase the torsional stiffness of the base chassis 2-105 by a factor of three compared to having no diagonal ribs. An increased torsional stiffness can help prevent instability of laser operation and improve the module's resistance to perturbing forces acting on the base chassis 2-105. In some cases, at least portions of the ribs can extend from a bottom of a cavity to a top surface of the base chassis 2-105, so that one or more covers (not shown) for the laser module 1-108 can attach to the ribs. In this regard, any suitable cover may be used including, but not limited to, a stiff metal cover (e.g., a metal having a thickness greater than approximately 1 mm), a stiff polymer cover (e.g., a polymer having a thickness greater than approximately 2 mm), or a flexible material (metal or polymer) that can be sealed to the base chassis 2-105, or held against the base chassis 2-105 with a supporting piece (e.g., a metal frame). In some cases, a covering material comprises Tyvek® (approximately 0.25 mm thick) that is held against the base chassis with a metal frame (approximately 1.5 mm thick).

In some implementations, one or more mounting features 2-103 can be located at one or more ribs 2-107. The mounting features 2-103 can be used to mount the compact laser module 1-108 to an instrument or other platform. In some cases, the mounting features provide kinematic mounting, so that each laser module 1-108, or the same laser module, reproducibly mounts in nearly the same location and alignment (e.g., to within ±100 microns). Kinematic mounting may also reduce induced stresses caused by the mounting process. The mounting features 2-103 may comprise holes that are tapped or are clear. The holes can be countersunk or counterbored. For kinematic mounting, there can be three mounting features 2-103 for which the bottom surfaces (not shown in FIG. 4) comprise a conical contacting surface or ring contact for a first mounting feature, a wedged contacting surface or two-point contacting surface for a second mounting feature, and a flat surface or single-point contact for a third mounting feature. Alternatively, two countersunk holes at the mounting features 2-103 may be used to align the base chassis 2-105 to a receiving support structure.

A mode-locked laser 110 of the laser module 1-108 can comprise an output coupler 1-111 at an output end of the laser's cavity, a gain medium 1-105, and a saturable absorber mirror (SAM) 1-119 at an opposite end of the laser cavity. There can be multiple mirrors 2-116, 2-117, 2-120, 2-121, 2-122, 2-123, 2-124, 2-125 within the laser cavity to fold the optical axis 1-125 of the laser and extend the length of the laser cavity to achieve a desired pulse repetition rate or pulse separation interval T. There can also be beam-shaping optics (e.g. lenses and/or curved mirrors) within the laser cavity to alter a size and/or shape of the intracavity laser beam.

Example optical components for a mode-locked laser that operates at a lasing wavelength of 1064 nm will now be described. It will be appreciated that embodiments of invention are not limited to only the described optical components. Fewer or more optical components may be used in some implementations (e.g., adding or removing mirrors to change the pulse repetition rate), and the optical coatings on components can be different for lasers that lase at different wavelengths.

The gain medium 1-105 can comprise a neodymium-doped material that is mounted in a thermally-conductive mount (e.g., an aluminum or copper block or other thermally-conductive material) which dissipates heat into the base chassis 2-105. When the mode-locked laser operates at high average powers (e.g., over 300 mW) thermal lensing effects in the gain medium 1-105 occur. In some cases, such thermal lensing could destabilize operation of the laser. To improve heat transfer from the gain medium to the thermally-conductive mount, the gain medium 1-105 can be wrapped in indium foil or any other suitable material that improves heat transfer to the thermally-conductive mount. In some cases, silver epoxy or any other suitable thermally-conductive adhesive can be used to secure the gain crystal to the thermal mount. In some cases, the gain medium 1-105 and thermally-conductive mount can be mounted on a thermo-electric cooler (TEC), which can sink heat into the base chassis 2-105. The TEC or other active cooling techniques such as liquid cooling can provide active temperature control of the gain medium 1-105 and reduce thermal lensing effects.

Elimination of active cooling of the gain medium 1-105 can reduce cost and complexity of the laser. Active temperature control of the gain medium need not be used for the mode-locked laser 110 of the present embodiments, even when optical pumping powers of up to 10 Watts are used to pump the gain medium. Surprisingly, the mode-locked laser 110 remains stably mode locked over this range of pump power, even though the associated thermal lensing effects (positive lensing) can change a thermally-induced focal length of the gain medium from 0 to approximately 15 diopters over the pump power range. For thermal lensing in excess of 15 diopters, the laser cavity can become an unstable resonator that may not support mode-locked operation nor continuous-wave operation. The stability of mode locking over such a large range of thermal lensing in the gain medium is due in part to the selection and arrangement of optical components for the mode-locked laser 110. According to one embodiment, stability and improved performance of mode-locked operation depends critically on having an amount of thermal lensing occur in the gain medium. In embodiments, stable mode-locked operation of the mode-locked laser 110 can be obtained for an amount of thermal lensing between one diopter and 15 diopters of positive lensing effect. Even though the thermal lensing may vary over this range, no mechanical adjustments need be made to the laser cavity to maintain stable mode locking. Improved performance of the mode-locked laser can be obtained when the amount of thermal lensing in the gain medium 1-105 is between 8 diopters and 12 diopters of positive thermal lensing. For continuous-wave operation, there can be between 0 diopter and at least 15 diopters of positive thermal lensing. An amount of thermal lensing (greater than approximately 4 diopters) can be measured by passing a continuous wave laser probe beam (e.g., from a helium neon laser or laser diode) through the gain medium 1-105 (e.g., at an angle) and measuring a relative displacement of the probe beam at a distance from the gain medium between "pump-beam-on" and "pump-beam-off" states. A pump-beam-on state is when the laser diode pump beam is on and exciting the gain medium 1-105 for mode-locked lasing of the laser 110. Values below 4 diopters can be difficult to measure accurately, since the relative displacement becomes small.

Absorption of an optical pump beam in the gain medium 1-105 can cause thermal lensing in the gain medium. In embodiments, an amount of thermal lensing in the gain medium can be changed by changing an amount of power in an optical pump beam applied to the gain medium 1-105 (e.g., changing an amount of power from pump module 2-140). Additionally or alternatively, an amount of thermal lensing in the gain medium can be changed by tuning an optical wavelength of an optical pump beam used to excite the gain medium 1-105. Tuning of the optical pump beam's wavelength can be performed, for example, by tuning a temperature of a laser diode in the pump module 2-140. Tuning a pump beam's wavelength can change an amount of absorption of the optical pump beam in the gain medium 1-105.

In some implementations, the gain medium 1-105 can comprise neodymium vanadate (e.g., $Nd^{3+}$:YVO4), which can provide lasing at 1064 nm. Other solid state crystals such as, but not limited to, Nd:YAG, Nd:YLF, and Cr:Forsterite can be used in other embodiments. In some implementations, a neodymium vanadate gain medium 1-105 can be used to provide lasing at 1342 nm alternatively or additionally, provided optical components in the cavity are designed and coated for lasing at this wavelength. The gain medium can have a length between 3 mm and 11 mm, in some cases. In some embodiments, the length of the gain medium can be between 5 mm and 9 mm. The neodymium dopant level (atomic %) can be between 0.10% and 1%, in some cases. In some implementations, the dopant level can be between 0.10% and 0.50%. In some implementations, the dopant level can be between 0.24% and 0.30%. According to some embodiments, the crystal length can be approximately 7 mm and the dopant level can be approximately 0.27%. Doping levels (atomic %) appreciably higher than 0.3% for lengths of approximately 7 mm can destabilize operation of the laser at higher operating powers (e.g., induce lasing in higher-order spatial modes, or destabilize or terminate mode locking), which may undesirably require readjusting intracavity components. For example, with 1% doping, mode locking terminated above a certain pump power level, and intracavity optical elements had to be readjusted to regain mode locking. The transverse dimension or dimensions of the gain medium 1-105 can be any suitable value (e.g., between 1 mm and 4 mm). The gain medium can be in the form of a cylindrical rod, rectangular bar, or any other shape.

End facets of the gain medium 1-105 can be anti-reflection coated for the lasing wavelength $\lambda 1$ (which can be about 1064 nm for neodymium vanadate) and for the pump wavelength $\lambda p$ (which can be about 808 nm for neodymium vanadate), according to some embodiments. In some embodiments, one end facet of the gain medium can be coated with an output coupler coating, so that the end facet acts as an end mirror of the laser cavity and a separate output coupler 1-111 need not be used.

The gain medium 1-105 can be mounted in a non-adjustable mount (a mount that provides no fine angular or positional adjustment) in an orientation where end facets of the gain medium have normal vectors oriented at an angle between about 1 degree and about 3 degrees to the optical axis 1-125 of the laser cavity. For example, a thermally-conductive mount for the gain medium can include a recess in which the gain medium 1-105 is placed. The recess can align the gain medium to the thermally-conductive mount. The thermally-conductive mount can then register to features on the base chassis 2-105 (e.g., any one or combination of machined surfaces, pins, screw holes) to align the gain medium at an angle to the optical axis 1-125 of the laser cavity. According to some implementations, the gain medium 1-105 can be cut and oriented in its mount so that it aligns with a favored polarization intended for lasing. For example, the gain medium 1-105 can be oriented to lase with a linear polarization parallel to the Y axis in FIG. 4.

According to some embodiments, an output coupler 1-111 for a compact mode-locked laser can be a high-quality laser optic having a surface quality of 10-5 (scratch and dig) and a wavefront error of at most $\lambda/10$. One surface of the output coupler 1-111 can be coated with a multi-layer dielectric to provide a reflectivity having a value between about 75% and about 95% for the lasing wavelength $\lambda_1$ and allow (with minimal reflectance) transmission of a pump wavelength $\lambda_p$ that is used to excite the gain medium 1-105. In some embodiments, the lasing wavelength may be about 1064 nm and the pump wavelength may be about 808 nm, though other wavelengths can be used in other embodiments. In some implementations, the reflectivity of the output coupler at the lasing wavelength is between 82% and 88%. An output coupler within this range of reflectivity provides a desired amount of output power with stable operation of the laser and provides appropriate amounts of fluence on the saturable absorber mirror 1-119 over an operating range of the laser.

A second surface of the output coupler 1-111 (toward the laser output) can be coated with an antireflection coating for both the pump wavelength and lasing wavelength, and can be oriented at an angle (e.g., between about 1 degree and about 4 degrees) with respect to the reflective surface of the output coupler. A small amount of reflection of the lasing wavelength from the output (transmitting) surface of the output coupler 1-111 can appreciably and adversely broaden pulses from the mode-locked laser. According to some embodiments, the coatings on the output coupler are dichroic, so as to transmit with negligible reflection the pump wavelength $\lambda_p$.

According to some embodiments, the output coupler 1-111 can be mounted in a two-axis adjustable mount that provides angular adjustment with respect to the optical axis 1-125 about two orthogonal axes (e.g., about the Y and X axes in FIG. 4). In some embodiments, the output coupler 1-111 can be mounted in a non-adjustable mount which can be integrated into the base chassis 2-105. A non-adjustable mount reduces cost and complexity of the compact laser. In yet other embodiments, the output coupler 1-111 can be formed as a multilayer optical coating on an end-face of the gain medium 1-105 instead of a separate optical component comprising a transparent substrate and one or more optical coatings.

Changing a distance between the output coupler 1-111 and the gain medium 1-105 can change the FWHM value of the mode-locked pulse temporal profile (also referred to as pulse duration). Mode-locking of the laser can be achieved with the distance between the output coupler 1-111 and the gain medium 1-105 varied between 0 mm and 10 mm, and the pulse duration can be varied between approximately 9 picoseconds and approximately 38 picoseconds over this range of distances by selecting different distances to obtain different pulse durations. According to some embodiments, the distance between the output coupler 1-111 and the gain medium 1-105 is set between 4 mm and 8 mm.

Stable and efficient operation over a range of average lasing powers is achieved when the intracavity beam waist of the laser at the output coupler 1-111 is between 100 microns and 180 microns (beam radius measured at $1/e^2$ level). The value of the beam waist at the output coupler 1-111 is determined in part by intracavity optics, such as curved mirror 2-117, by distance of the output coupler to the curved mirror, and by the pump beam waist in the gain medium 1-105. According to some embodiments, the beam waist of the lasing wavelength in the gain medium can be significantly smaller that the pump beam waist in the gain medium 1-105. For example, the beam waist for the lasing wavelength in the gain medium can be between 100 microns and 150 microns in the gain medium, and a smallest waist for the pump beam can be between 180 microns and 250 microns, wherein the pump beam may not be fully symmetric about its optical axis. The value of the beam waist at the output coupler 1-111 and in the gain medium 1-105 may also be affected by the focal length of the second curved mirror 2-127 and its distance to the saturable absorber mirror 1-119. Having a smaller beam waist for the lasing beam of the mode-locked laser 110 than the laser diode pump beam can improve stability of the mode-locked laser operation (e.g., make the laser less susceptible to power and mode-locking fluctuations due to relative motion of the laser beam and laser diode pump beam in the gain medium 1-105. The term "beam waist" is used to refer to the spatial extent at which the laser beam intensity falls from a peak value to a $1/e^2$ value on opposite sides of the beam. A round beam may be characterized by a single beam waist. An elliptical beam may be characterized by two beam waists: one for the beam's minor axis and one for the beam's major axis.

At an opposite end of the laser cavity, a saturable absorber mirror (SAM) 1-119 may be mounted. The SAM can comprise a multilayer semiconductor structure that exhibits nonlinear optical absorption (e.g., a multiple quantum well) and a high reflector (e.g., Bragg reflector) formed on a substrate. The nonlinear optical absorption can induce passive mode locking in the laser. For example, the SAM can exhibit higher absorption and loss at low optical intensities, and can bleach or exhibit little absorption and less loss at high optical intensities. The semiconductor structure can be spaced from the high reflector in the SAM so that the semiconductor structure is located at approximately a peak intensity of an optical standing wave created by the optical field incident on and reflected from the high reflector. An example of a SAM is part number SAM-1064-5-10ps-x available from BATOP Optoelectronics GmbH of Jena, Germany. Because of the SAM's nonlinear optical absorption, the laser preferentially operates in a pulsed mode of operation (passively mode locked) since the high intensities of the optical pulses experience less loss in the cavity than lower intensity, continuous-wave operation of the laser.

According to some embodiments, the SAM can be formed from a gallium-arsenide semiconductor composition. The SAM can be cut from a larger substrate or wafer, and can be square in shape with a maximum dimension across the face of the SAM between 1 mm and 3 mm. A relaxation time of the SAM's absorption can be between 10 ps and 30 ps. A non-saturated absorption of the SAM can be between 2% and 6%. The modulation depth of the SAM can be between 60% and 74% of the SAM's non-saturated absorption. In some implementations, the relaxation time is approximately 25 ps and the non-saturated absorption is approximately 4%. Such a SAM 1-119 can support mode-locked lasing with pulse durations between 12 ps and 20 ps. A saturation fluence of the SAM can be about 70 microJoules/cm$^2$ ($\mu J/cm^2$), in some embodiments.

The optical fluence on the SAM from the intracavity laser beam should be kept below 2.5 milliJoules/cm$^2$ (mJ/cm$^2$) for prolonged operation of a gallium-arsenide SAM. At values equal to 5 mJ/cm$^2$ or higher, the SAM may damage. In some implementations, the fluence on the SAM can be kept below about 10 times the saturation fluence of the SAM. The fluence on the SAM can be controlled by controlling the beam waist at the SAM (e.g., with a curved mirror 2-127 located in the laser cavity) and by controlling the intracavity power with the choice of reflectivity of the output coupler 1-111. According to some embodiments, a beam waist at the SAM is between 80 microns and 120 microns when the output coupler reflectivity is between 82% and 88%.

Between the output coupler 1-111 and the SAM 1-119, there can be a plurality of mirrors that fold the optical axis of the laser cavity multiple times. Some of these mirrors (e.g., mirrors 2-115, 2-120, 2-121, 2-122, 2-123, 2-124, 2-125) can have flat surfaces and be mounted in non-adjustable mounts. According to some embodiments, two of the mirrors 2-117, 2-127 can have curved surfaces and comprise a focusing reflector. In some cases, another type of focusing optic (e.g., a lens or compound lens) can be used instead of focusing reflectors for mirrors 2-117, 2-127 (e.g., if the intracavity beam is not folded at the location of the mirrors 2-117 or mirror 2-127). For flat and curved mirrors that are used to fold the optical axis of the laser, the reflectivity of the mirror can be very high for the lasing wavelength at the angle of incidence for which the mirror will be used. For example, the reflectivity for such a mirror can be greater than 99% in some cases, and yet greater than 99.5% in some cases. The surface quality of one or more of the folding mirrors can be at least 10-5 (scratch and dig) and a wavefront error can be at most $\lambda/10$. In some cases, the surface quality of one or more of the folding mirrors can be at least 40-20 (scratch and dig) and a wavefront error can be at most $\lambda/10$. A higher value for scratch-dig surface quality can significantly reduce the cost of the folding mirrors.

In some implementations, at least one of the mirrors (e.g., mirror 2-124) can fold the intracavity beam multiple times for a single transit from the gain medium 1-105 to the SAM 1-119. For the example configuration shown in FIG. 4, a bounce sequence for an optical pulse 1-120 travelling from the gain medium 1-105 to the SAM 1-119 is a sequence of reflections from mirrors 2-115, 2-117, 2-120, 2-121, 2-122, 2-123, 2-124, 2-125, 2-124, 2-127, 2-124, and then to the SAM 1-119. In this sequence, one of the intracavity mirrors 2-124 is used for multiple reflections and the angle of incidence is reversed in sign on this mirror for at least two reflections as the beam travels from one end of the laser cavity to the other end. For example and referring to FIG. 4, the first angle of incidence is in the +Z direction and the second angle of incidence on mirror 2-124 is in the −Z direction as the beam travels from the output coupler 1-111 to the SAM 1-119. After reflecting from the SAM 1-119, the pulse will then return in the reverse bounce sequence to the gain medium. By having multiple folds of the optical axis within the compact laser module, the cavity length can be extended to obtain a pulse repetition rate below 200 MHz and as low as 50 MHz. The pulse repetition rate will depend upon the length of the laser cavity, which is determined in part by the number of bounces between mirrors in the cavity and the distances between the mirrors. According to some embodiments, the pulse repetition rate can be changed by relocating mirrors and adding or removing mirrors within the cavity between the first curved mirror 2-117 and the second curved mirror 2-127 to increase or decrease the optical path length between the output coupler 110 and saturable absorber mirror 1-119. Because the intracavity beam is approximately collimated between the first curved mirror 2-117 and the second curved mirror 2-127, changes to pulse repetition rate can be made more easily than if the beam were not collimated in this region. In some implementations, extra integrated optical mounts can be formed in the base chassis for relocating mirrors to obtain different pulse repetition rates.

As noted above, the inventors have recognized and appreciated that pulse repetition rates below 200 MHz and as low as 50 MHz are desirable for massively-parallel analysis of samples on a bio-optoelectronic chip. However, using multiple mirrors, with some mirrors used multiple times, requires a very high degree of stability of the mirrors with respect to each other to maintain stable mode-locked lasing over periods of hours. Integrated mounting of the mirrors against supporting surfaces in a base chassis 2-105 that includes strengthening ribs can achieve the requisite stability of the mirrors and stable mode-locking operation.

In some implementations, one folding mirror 2-115 can be configured to control polarization of radiation within the cavity and allow monitoring of pump-beam radiation (indicated as the heavy dashed line in FIG. 4). For example, the folding mirror 2-115 can be coated to reflect s polarization (polarization that is out of the plane of the base chassis, in the Y direction) with a high reflectivity greater than 99%, or even greater than 99.5% in some cases, and to have a lower reflectivity for the orthogonal p polarization, so that lasing in the p polarization is prevented. In some cases, the folding mirror 2-115 can be a polarizing beam splitter that transmits more than 20% of the p polarization and reflects the s polarization with high reflectivity. The folding mirror 2-115 can additionally transmit most or nearly all of the pump-beam radiation to a photodetector 2-116 located behind the mirror. The folding mirror can include a dichroic coating to allow transmission of the pump-beam radiation, in some embodiments. In other embodiments, a dichroic coating may not be used, and the coating for the lasing wavelength may allow adequate transmission of the pump-beam radiation through the folding mirror 2-115 for detection. An output from the photodetector 2-116 can be provided to the PCB 2-190 for signal processing and/or transmission to an external signal processor.

In some embodiments, two curved mirrors 2-117, 2-127 can be designed and located within the laser cavity to obtain desired beam waist sizes within the gain medium 1-105 and the SAM 1-119. A first curved mirror 2-117 can be located in a first portion of the laser cavity near the gain medium 1-105. A second curved mirror 2-127 can be located in a second portion of the laser cavity near the SAM 1-119. At least between the curved mirrors, there can be a plurality of folding mirrors that fold the optical axis of the laser and extend the laser cavity length in a cavity length extending region. There can additionally be a mirror 2-124 between curved mirror 2-127 and the SAM 1-119 that folds the intracavity laser beam multiple times to extend the length of the cavity in the cavity length extending region. For example, curved mirror 2-127 and mirror 2-124 can fold the intracavity beam three times on immediately successive bounces from these two reflectors, as indicated in FIG. 4.

According to some embodiments, the first curved mirror 2-117 can be a spherical reflector and have a focal length $f_1$ between 240 mm and 260 mm. A tolerance on the focal length for this reflector can be ±1% of the focal length. The inventors have found that the first curved mirror 2-117, with a focal length of approximately 250 mm, can be placed between 230 mm and 310 mm from the output coupler 1-111 and stable mode-locked operation having different characteristics can be obtained. According to some embodiments, the first curved mirror can be located between 280 mm and 300 mm from the output coupler to obtain stable mode-locked operation over a large range of operating powers of the compact laser module. In this configuration, the gain medium 1-105 can be located between 4 mm and 8 mm from the output coupler. The focal length of the first curved mirror 2-117 and its location with respect to the gain medium 1-105 and output coupler 1-111, and the focal length of the second curved mirror 2-127 and its location with respect to the SAM 1-119 can determine the beam waist of the intracavity beam in the gain medium.

A focal length of the first curved mirror 2-117 may have other values in other embodiments. For example, a shorter focal length $f_1 < 230$ mm can be used for a more compact mode-locked laser that operates at lower powers. In embodiments, the output coupler 1-111 can be placed a distance $d_1$ from the first curved mirror 2-117 that is in a range of values within 30% of the focal length $f_1$ (e.g., $0.7f_1 < d_1 < 1.3f_1$). In some cases, $0.9f_1 < d_1 < 1.3f_1$.

In some implementations, the first curved mirror 2-117 can be mounted in an adjustable mount that provides only two degrees of freedom for adjusting orientation angles (in-plane, and out-of-plane angles) of the mirror with respect to the optical axis of the laser. An adjustable mount can allow an operator to finely adjust the position (one or more of X, Y, Z) and/or orientation (pitch and/or yaw with respect to the optical axis of the incident intracavity beam) of the optical component while the laser is lasing, so that operation of the laser can be tuned for stability, beam quality, output power, and/or pulse characteristics. Fine tuning can be achieved by micrometers and/or finely-threaded screw adjustments on mirror mounts, for example. It is noted that an adjustable is not a requirement for the first cured mirror 2-117. Furthermore, other mirrors used to form the laser cavity may also be used to finely adjust the cavity alignment.

Providing only two degrees of freedom for the first curved mirror 2-117 and only one degree of freedom for a folding mirror (e.g., mirror 2-123) as the only adjustments for aligning the laser cavity in real time while the laser is lasing can reduce cost and complexity of the compact mode-locked laser module. In other cases, the mirror mount for the first curved mirror 2-117 can include additional degrees of freedom for adjusting the position of the mirror, for example. According to some embodiments, adjustments can be made to the pump module 2-140 after adjusting curved mirror 2-117 to align or re-align the pump beam and increase output power from the mode-locked laser.

A second curved mirror 2-127 can be a spherical reflector and have a focal length $f_2$ between 240 mm and 260 mm. A tolerance on the focal length for this reflector can be ±1% of the focal length. The inventors have found that the second curved mirror 2-127, with a focal length of approximately 250 mm, can be placed between 260 mm and 290 mm from the SAM 1-119 and stable mode-locked operation having different characteristics can be obtained. According to some embodiments, the second curved mirror can be located between 270 mm and 285 mm from the SAM 1-119 to obtain stable mode-locked operation over a large range of operating powers of the compact laser module. The focal length of the second curved mirror 2-127 and its location with respect to the SAM 1-119 can determine the beam waist of the intracavity beam at the SAM 1-119 and also affect the beam-waist at the gain crystal.

A focal length of the second curved mirror 2-127 may have other values in other embodiments. For example, a shorter focal length $f_2 < 240$ mm can be used for a more compact mode-locked laser that operates at lower powers. In embodiments, the SAM 1-119 can be placed a distance $d_2$ from the second curved mirror 2-127 that is in a range of values within 20% of the focal length $f_2$ (e.g., $0.8f_2 < d_2 < 1.2f_2$). In some cases, $f_2 < d_2 < 1.2f_2$.

The second curved mirror 2-127 can be mounted in a non-adjustable mount, for example, to reduce cost and complexity of the laser module. As described above, all of the reflective components in the laser cavity (except the first curved mirror 2-117 and the folding mirror 2-123) can be mounted in self-aligning, non-adjustable mounts. Further, the first curved mirror 2-117 can have only two degrees of freedom for angular adjustments and the folding mirror 2-123 can have only one degree of freedom for angular adjustment. The inventors have discovered that the mode-locked laser cavity can be aligned for stable operation for long periods of time using only these three adjustments, according to some embodiments. For example, the first curved mirror 2-117 can be used to steer a beam from the gain medium 1-105 to the SAM 1-119, which is mounted in a fixed location to receive the beam. Any out-of-plane deviations (in the ±Y directions in FIG. 4) can be accommodated by adjusting the single degree of angular adjustment on folding mirror 2-123. If the SAM 1-119 does not receive the intracavity beam at normal incidence so as to reflect the beam back along the same path, the angle of incidence on the SAM can be adjusted by translating the intracavity beam on the second curved mirror 2-127. Since the SAM 1-119 is nearly at the focus of the second curved mirror, a translation of the beam on this mirror alters the incidence angle at the SAM. The intracavity beam can be translated across the surface of the second curved mirror by making angular adjustments to the first curved mirror 2-117. Adjustments can be made to the first curved mirror until the intracavity beam is reflected back on itself from the SAM 1-119.

The inventors have discovered that the spot size of the intracavity laser beam on the SAM can be more sensitive to changes in distance between the first curved mirror 2-117 and the laser's output coupler 1-111 than to changes in distance between the second curved mirror 2-127 and SAM 1-119. This result relates to the extended cavity length between the first curved mirror 2-117 and the second curved mirror 2-127. This extended cavity length can be more than half the length of the laser cavity, throughout which the intracavity laser beam can be approximately collimated. Changes in the distance between the curved mirror 2-117 and output coupler 1-111 can affect collimation in the extended cavity, which can amplify changes in beam size at the second curved mirror 2-127. The amplification in turn affects the spot size in the SAM 1-119 more strongly than changes in distance between the second curved mirror 2-127 and SAM 1-119. Accordingly, the position of the first curved mirror 2-117 can be used to adjust the fluence on the SAM 1-119. In some embodiments, the amplification effect can be reduced by increasing the focal length of the second curved mirror 2-127.

When the laser cavity is aligned and configured as described above, such that a beam waist in the gain medium 1-105 is between 100 microns and 150 microns, and the beam waist at the SAM 1-119 is between 80 microns and 120 microns, the inventors have discovered that the laser cavity satisfies a "stability criterion" for optical resonators (a condition known to those skilled in the art of lasers) that spans a change from 0 diopter to 15 diopters of thermal lensing effects in the gain medium 1-105 and for focal length errors of the two curved mirrors 2-117, 2-127 of ±1%. At high optical powers, the gain medium 1-105 can acquire appreciable heat from the pump radiation, and the heated gain medium can create an optical lens (also referred to as thermal lensing) that has a focusing power (diopter) that is dependent upon the temperature of the medium. For optically-pumped, high-power lasers, the changes due to this thermal lensing can destabilize the laser and extinguish lasing for increases in pump power by 50% from an initial stable operating point. The inventors have observed that the compact mode-locked laser module 1-108 maintains stable mode-locking operation for variations in pump power from 2 Watts to 8 Watts, an increase of 300% in pump power from an initial stable operating point. The range of stability for the laser cavity is surprisingly large, and allows the compact mode-locked laser to be operated over a large range of intracavity and output powers. For example, the average output power from the laser can vary between 350 milliwatts and 3.5 Watts over this range of pump power, while the FWHM pulse duration remains between 12 picoseconds and 18 picoseconds. This output can be frequency doubled to produce pulses of a same duration at a wavelength of 532 nm, for example, with average power levels between 100 milliwatts and 1.5 Watts.

According to some embodiments, there can be optical components mounted within the laser cavity to help stabilize operation of the mode-locked laser and/or improve beam quality of the mode-locked laser. For example, a spatial mode filter 2-118 can be located in the laser cavity and configured to prevent lasing in higher-order spatial modes. The mode filter 2-118 can comprise an aperture of any suitable shape (e.g., round, oval, crescent shaped, square, rectangular, polygonal, etc.). The aperture can be mounted in a non-adjustable mount, or can be mounted such that it can be moved in directions transverse to the intracavity beam's optical axis. The size of the aperture can be adjustable in some cases (e.g., an iris). In various embodiments, the aperture constrains lasing operation to the lowest-order transverse spatial mode of the laser cavity, which can improve stability of mode-locking.

Beam steering components can be included in the laser module 1-108 in some embodiments for dynamic stabilization and alignment. For example, one or more anti-reflection coated laser windows or optical flats 2-128 that can be rotated at an angle with respect to the intracavity beam can be operated automatically by an actuator 2-162 to translate and/or change an incident angle of the intracavity beam on the SAM 1-119. There can be mechanical linkage 2-164 between an actuator and laser window and a pitch or yaw mount for the laser window that enable automated pitch or yaw adjustments to the laser window 2-128. The actuator 2-162 can comprise a stepper motor, piezoelectric transducer, capacitive transducer, or any other suitable actuator.

Rotation of an intracavity laser window will shift laterally the outgoing beam from the laser window in the direction of rotation. The amount of lateral shift can be determined by applying Snell's law to the two interfaces of the laser window. If the laser window is located between the second curved mirror 2-127 and the SAM 1-119, then rotation of the laser window will mainly translate the intracavity beam on the SAM. Rotation of such laser window can be used to extend the lifetime of the SAM by moving the intracavity beam across the SAM. A scanning motion may reduce fatigue of the SAM, or if the SAM has been damaged the beam can be moved away from the damaged spot. If the laser window 2-128 is located before the second curved mirror 2-127 as depicted in FIG. 4, then rotation of the laser window will mainly change the incident angle of the intracavity beam on the SAM. Rotation of such laser window can be used to dynamically align or realign the laser cavity to obtain and/or maintain stable mode-locked operation.

Signals that indicate laser performance and that can be used for automatically adjusting intracavity beam-steering components can include any one or combination of pump power (detected with photodetector 2-116 or a pump photodetector (not shown) that is mounted in the pump module), laser power and/or pulse characteristics (detected with a laser output photodetector 2-154, which can be sensitive to the lasing wavelength), and second-harmonic power (detected with a doubled-output photodetector 2-182). The signal or signals can be provided to circuitry on PCB 2-190 for processing and generation of feedback control signals to operate one or more actuators 2-162. In some embodiments, one or both of the laser output photodetector 2-154 and doubled-output photodetector 2-182 can be mounted on the PCB 2-190 and received radiation through a hole and/or window (not shown) located in a side of the mode-locked laser module 1-108. In some implementations, rotation of an intracavity beam-steering component can be automated to fine tune cavity alignment and/or change a position of the intracavity beam on the SAM 1-119 based on one or more feedback signals.

According to some embodiments, cavity alignment can be obtained additionally or alternatively by inducing asymmetric thermal gradients in the gain medium 1-105. Asymmetric thermal gradients can affect thermal lensing and alter the refractive index within the gain medium 1-105 in such a way to cause small angular deflections in the intracavity laser beam as it passes through the gain medium 1-105. In some implementations, one or more temperature-controlling devices (e.g., resistive heating elements, TEC coolers, or a combination thereof) can be coupled to one or more sides of the gain medium. According to some embodiments, the gain medium 1-105 can have two to four independently-operable, temperature-controlling devices (not shown in FIG. 4) thermally coupled to two to four faces (four longitudinal edges) of the gain medium. Thermal coupling can comprise thermal epoxy or indium foil located between a temperature-controlling device and face of the gain medium 1-105. A temperature-controlling device can also include thermal coupling to a heat sink (such as the laser block) on an opposite side of the temperature-controlling device. In some cases, operation of one or more of the temperature-controlling devices can provide beam deflection transverse to the optical axis 2-111. By selectively altering temperatures at the temperature-controlling devices, the intracavity laser beam can be steered and re-aligned. In some cases, one or more intracavity laser windows 2-128 can be adjusted in tandem with thermal beam steering in the gain medium to reposition the intracavity beam on the SAM, for example, and/or maintain stable mode-locked operation of the laser.

The inventors have recognized and appreciated that average power and/or spectral characteristics of the mode-locked laser can be determinative of stable, mode-locked operation. For example, if the laser's average power during mode-locked operation falls below a certain value, there may not be enough nonlinear optical absorption in the SAM 1-119 to support mode locking. The laser may then Q-switch and damage the SAM 1-119. In some cases, rapid fluctuations of the laser's average output power may indicate that the laser is Q-switching in addition to mode locking, which can damage the SAM 1-119. In some embodiments, at least one sensor 2-154 (e.g., a photodiode) can be included and arranged to sense optical power produced by the laser 110 and/or output pulse or mode-locking characteristics of the laser. For example, a signal from a first sensor 2-154 can be spectrally analyzed to detect sidebands near the mode-locking frequency, which can indicate the onset of Q-switching and/or instabilities in the mode-locked pulse train of the laser 110. A second sensor (not shown) can detect average optical power produced by the laser 110. If the sensed average laser power drifts below a preset level and/or if sidebands or power fluctuations are detected by the first sensor 2-154, an automated cavity alignment routine can be executed to recover power and/or the laser can be shut off for servicing. In some cases, sidebands that indicate instabilities in the mode-locked pulse train are due to lasing of higher-order spatial cavity modes. Such instabilities can be corrected by adjusting an intracavity spatial mode filter 2-118 automatically or manually, for example. According to some embodiments, one or more sensors 2-154 that are sensitive to the lasing wavelength can be mounted on PCB 2-190.

In some cases, additional signals can be processed to analyze laser behavior. For example, the pump power can be evaluated with a pump power sensor 2-116 (which can be a photodiode or other suitable photodetector) in conjunction with the average power level from the laser. In some embodiments, the amount of frequency-doubled power can be monitored with sensor 2-182 (which can be a photodiode or other suitable photodetector) additionally or alternatively. For example, a reduction in average frequency-doubled power while the average laser power remains nearly constant could indicate changes in mode-locked pulse length, or a problem with the frequency-doubling optical components.

The components of the compact mode-locked laser module 1-108 are attached to the based chassis 2-105 such that the laser cavity is substantially in a single plane. The inventors have realized that to modify such a laser module to be suitable as an optical characterization apparatus, it would be useful to have the SAM 2-128 in a different plane than the rest of the components. In particular, the SAM 2-128 may be mounted in a mount that is outside of the housing of the laser module 1-108 that orients the SAM 2-128 in a direction that is perpendicular to the other optical components of the laser cavity.

Figure 5:
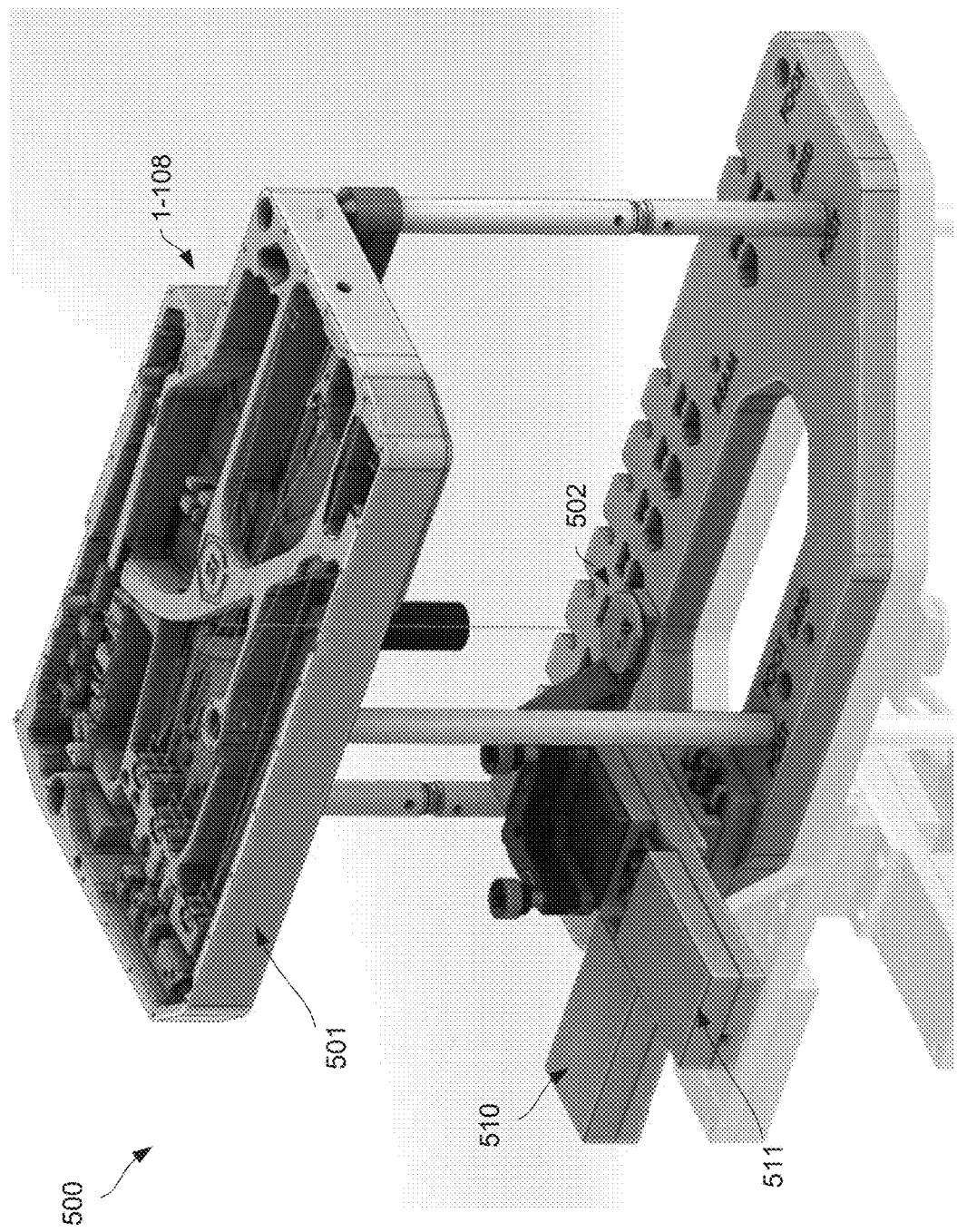
FIG. 5 illustrates a portion of an optical characterization apparatus, according to some embodiments.

One example of such embodiment is shown in FIG. 5, where a portion 500 of an optical characterization apparatus is illustrated. A mode-locked laser module 1-108 includes housing 501. Most of the components of the mode-locked laser module 1-108 are in a single plane within the housing 501. A mount 502, positioned outside of the housing 501 includes a receptacle in which an optical component, such as a mirror or a SAM may be placed. The mount 502 is arranged such that the optical component is dropped in from above. The laser beam is incident upon the optical component from above. The mount 502 is mounted on a motorized two-dimensional translation stage, which includes two motor portions 510, 511 which may control the position of the optical component within the mount 502 in the horizontal plane.

Figure 6:
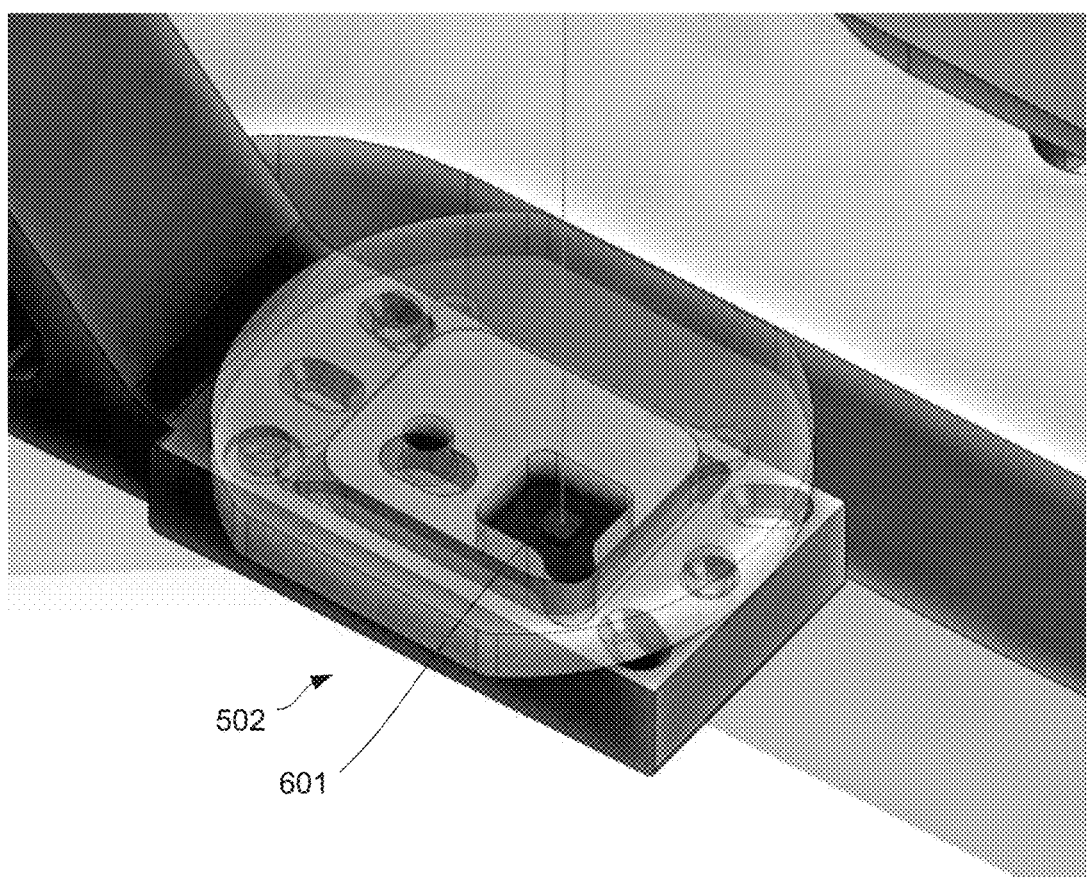
FIG. 6 illustrates an end mirror mount for an optical characterization apparatus, according to some embodiments.

FIG. 6 shows a close-up view of the mount 502 with a SAM 601 disposed within the mount. In some embodiments, the mount 502 may have a larger mounting area to accommodate an entire SAM wafer. An entire SAM wafer would not fit within the housing 501, but by positioning the mount 502 outside of the housing 501, there is adequate space for a full wafer to be scanned.

Figure 7:
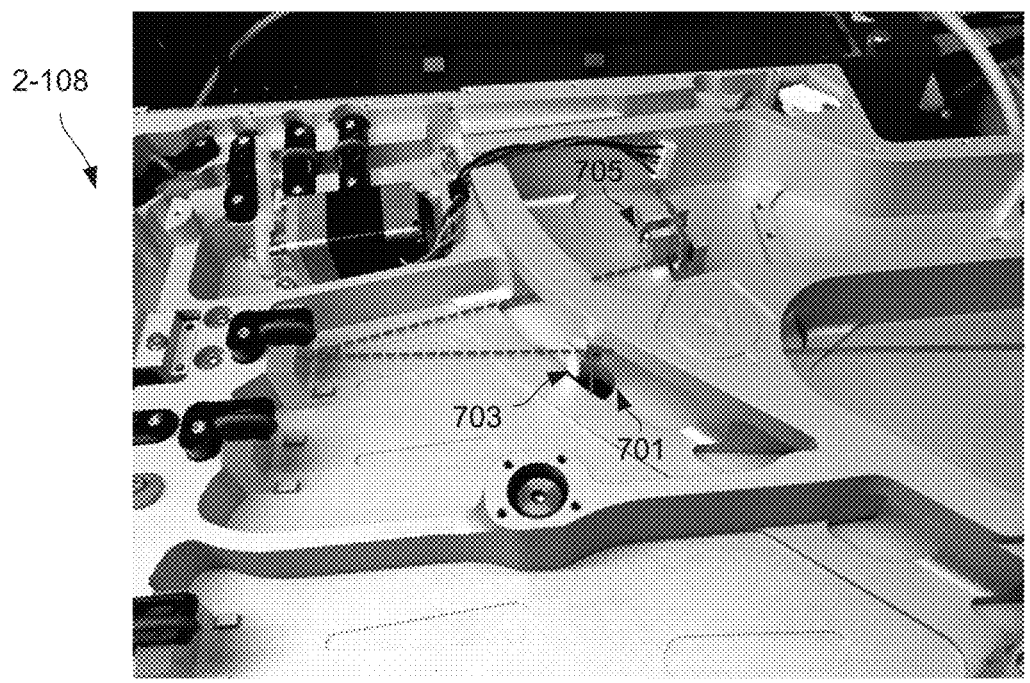
FIG. 7 illustrates how to modify a pulsed laser to obtain an optical characterization apparatus, according to some embodiments.

To modify the existing mode-locked laser module 1-108 of FIG. 4 such that the end mirror is outside of the housing, the laser beam must be redirected out of the housing 501. To accomplish this a hole is formed in the base chassis 2-105 at the location indicated by the black circle 2-107 in FIG. 4. A pick-off mirror is positioned above the hole to reflect the laser beam down through the hole rather than allowing the laser beam to be incident upon intracavity mirror 2-124 and SAM 1-119. Whereas most of the mirrors of FIG. 4 are configured to efficiently reflect s-polarized light within the plane established by the base chassis 2-105, the pick-off mirror that is added to the laser module 1-108 is configured to efficiently reflect p-polarized light. The modifications to the existing mode-locked laser module 1-108 are shown in FIG. 7, where the laser beam is reflected through the hole 701 by pick-off mirror 703. The dotted line of FIG. 7 represents the laser beam path without the modification, which would include reflection off the SAM 705. In some embodiments, the distance from the pick-off mirror 703 to the position of the SAM 705 in an unmodified system is equal to the distance from the pick-off mirror 703 to the SAM 601 in the mount 502. By keeping the distance the same, the characteristics of the laser measured using this setup will most closely resemble the behavior of the unmodified mode-locked laser module 1-108 that includes the SAM in the unmodified position.

Figure 8:
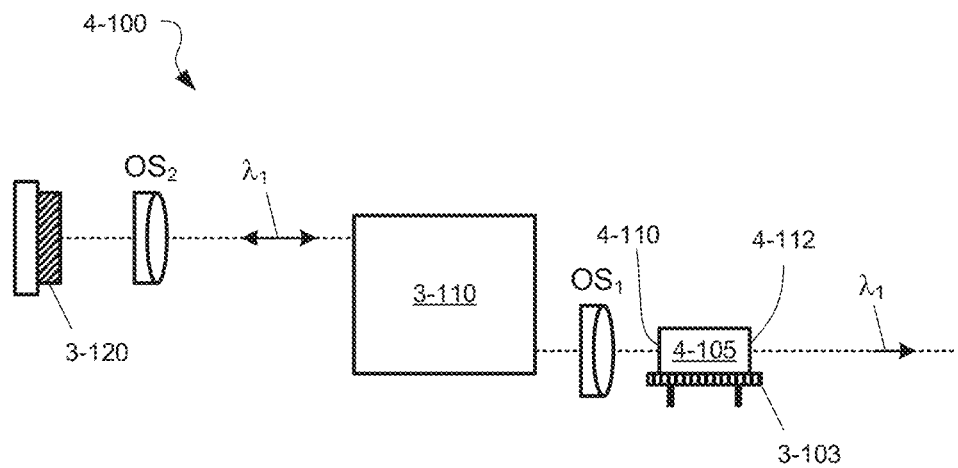
FIG. 8 illustrates a pulsed semiconductor laser, according to some embodiments.
Figure 9:
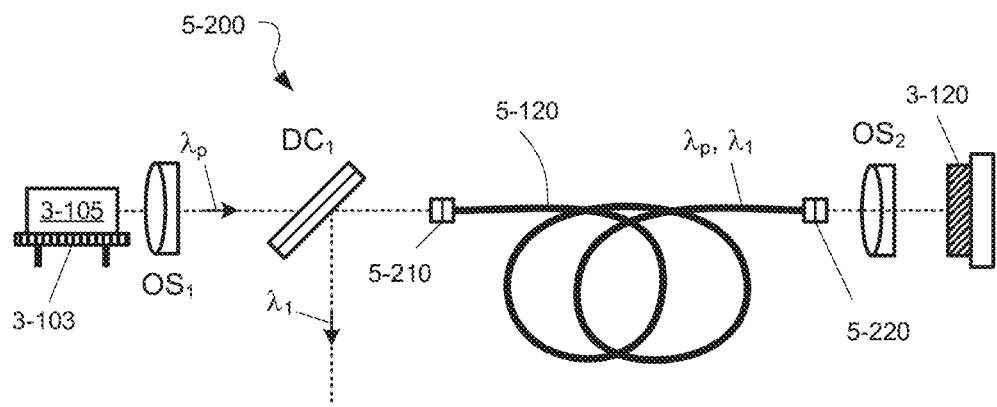
FIG. 9 illustrates a pulsed fiber laser, according to some embodiments

While FIGS. 4-7 illustrate a particular laser module that may be modified to be used as an optical characterization apparatus, embodiments are not so limited. Other laser systems may also be modified to act as an optical characterization apparatus. FIG. 8 illustrates a mode-locked semiconductor laser that may be used in some embodiments and FIG. 9 illustrates a mode-locked semiconductor laser that may be used in some embodiments.

Referring to FIG. 8, mode-locked laser diodes 4-100 may produce pulses at a desired wavelength (e.g., at blue, green, or red wavelengths) that will be used directly for probing samples or making measurements, according to some embodiments. In some cases, pulses produced by a laser diode may be converted to another wavelength (e.g., frequency doubled) for use in probing or measuring applications. For example, a mode-locked laser diode may produce pulses at infrared wavelengths, and these pulses may be frequency doubled to the blue, green, or red regions of the optical spectrum.

A mode-locked semiconductor laser may comprise a laser diode 4-105 and a saturable absorber mirror 3-120. The ends of the laser cavity may be defined by a reflective coating 4-112 formed on one end of the semiconductor laser diode 4-105 and the saturable absorber mirror 3-120, according to some embodiments. The SAM 3-120 may be mounted on a two-dimensional translation stage to allow the illumination spot of the laser beam to be scanned across the SAM 3-120. The laser cavity may include a first optical system $OS_1$ that reshapes and/or changes the divergence of an optical beam from the laser diode. The laser cavity may further include a second optical system $OS_2$ that may reshape and/or focus the intra-cavity beam onto the saturable absorber mirror. In some embodiments, the laser cavity may include an optical delay element 3-110. A mode-locked laser diode may lase at a wavelength $\lambda_1$ and produce a train of ultrafast pulses with durations shorter than about 100 ps.

In some implementations, a laser diode 4-105 may include optical coatings on either end of an optical waveguide structure. The optical coatings 4-110, 4-112 may be formed by any suitable deposition process, such as a vapor deposition process or a physical deposition process. In some implementations, a first end of the laser diode may include a partially-transmissive coating 4-112 that serves as an output coupler for the laser cavity. The transmissive coating 4-112 may transmit a portion of the lasing beam outside the cavity to provide a train of ultrafast pulses. The transmittance of the coating 4-112 may be between approximately 2% and approximately 15%, according to some embodiments, and its reflectivity may be between about 98% and about 85%. An opposite end of the laser diode 4-105 may be coated with an anti-reflection coating 4-110, so as to allow most of the radiation from the laser diode to pass into the laser cavity without significant reflection. For example, the anti-reflection coating 4-110 may reflect less than 1% of the lasing wavelength $\lambda_1$.

The use of mode-locked laser diodes may be advantageous for some embodiments that do not require high amounts of power, for example, power levels exceeding about 300 mW. One advantage of mode-locked laser diodes is their compact size and a reduction in the number of optical elements used in the laser. Because the lasing medium can be very small (e.g., less than 5 mm in width), it may be possible to use arrays of mode-locked laser diodes in some embodiments. In some implementations, an array of mode-locked laser diodes may share common optical elements. For example, two or more laser diodes may share one or more optical elements (e.g., one or more of an optical delay element 3-110, optical systems $OS_1$, $OS_2$, and saturable absorber mirror 3-120).

Referring to FIG. 9, ultrafast pulses may also be produced using mode-locked fiber lasers. A mode-locked fiber laser 5-200 may include optical elements that are used in diode-pumped solid-state lasers. However, in a mode-locked fiber laser the gain medium comprises a length of optical fiber 5-120 that can also provide an optical delay element for the laser cavity. According to some embodiments, a diode pump source 3-105 may provide a pumping wavelength $\lambda_p$ that is coupled into an end of the fiber 5-120, as depicted in FIG. 9.

In some implementations, optical coupling elements may be fabricated or bonded at opposing ends of the optical fiber 5-120. For example, a first optical element 5-210 may be bonded to or formed on a first end of the optical fiber. The first optical element may comprise a ball lens or a graded refractive index lens that is attached directly, or attached with a supporting structure, to an end of the optical fiber. Additionally, the first optical element 5-210 may include a dichroic coating that transmits a majority (e.g., more than about 98%) of the pump wavelength $\lambda_p$ and reflects a majority (between about 98% and about 85%) of the lasing wavelength $\lambda_1$. Accordingly, the first optical element 5-210 may comprise an output coupler for the fiber laser 5-200.

The second optical element 5-220 may comprise a dichroic coating formed on an end of the optical fiber, in some embodiments, that is engineered to transmit a majority (e.g., more than about 98%) of the lasing wavelength $\lambda_1$ and reflect a majority (e.g., more than about 98%) of the pump wavelength $\lambda p$ back into the optical fiber. In some embodiments, the second optical element 5-220 may comprise a ball lens or a GRIN lens that is attached directly, or coupled with a supporting structure, to an end of the optical fiber. For example, a GRIN lens may be adhered to an end of the fiber with an optical adhesive, and an exposed end of the GRIN lens may be coated with a dichroic coating that is engineered to transmit a majority (e.g., more than about 98%) of the lasing wavelength $\lambda_1$ and reflect a majority (e.g., more than about 98%) of the pump wavelength $\lambda_p$ back into the optical fiber. According to some embodiments, there may be a first optical lens system $OS_1$ that is used to couple pump radiation from the laser diode 3-105 into the optical fiber, and a second optical lens system $OS_2$ that is used to focus radiation from the optical fiber onto the saturable absorber mirror 3-120, which may be mounted on a two-dimensional translation stage.

Figure 10:
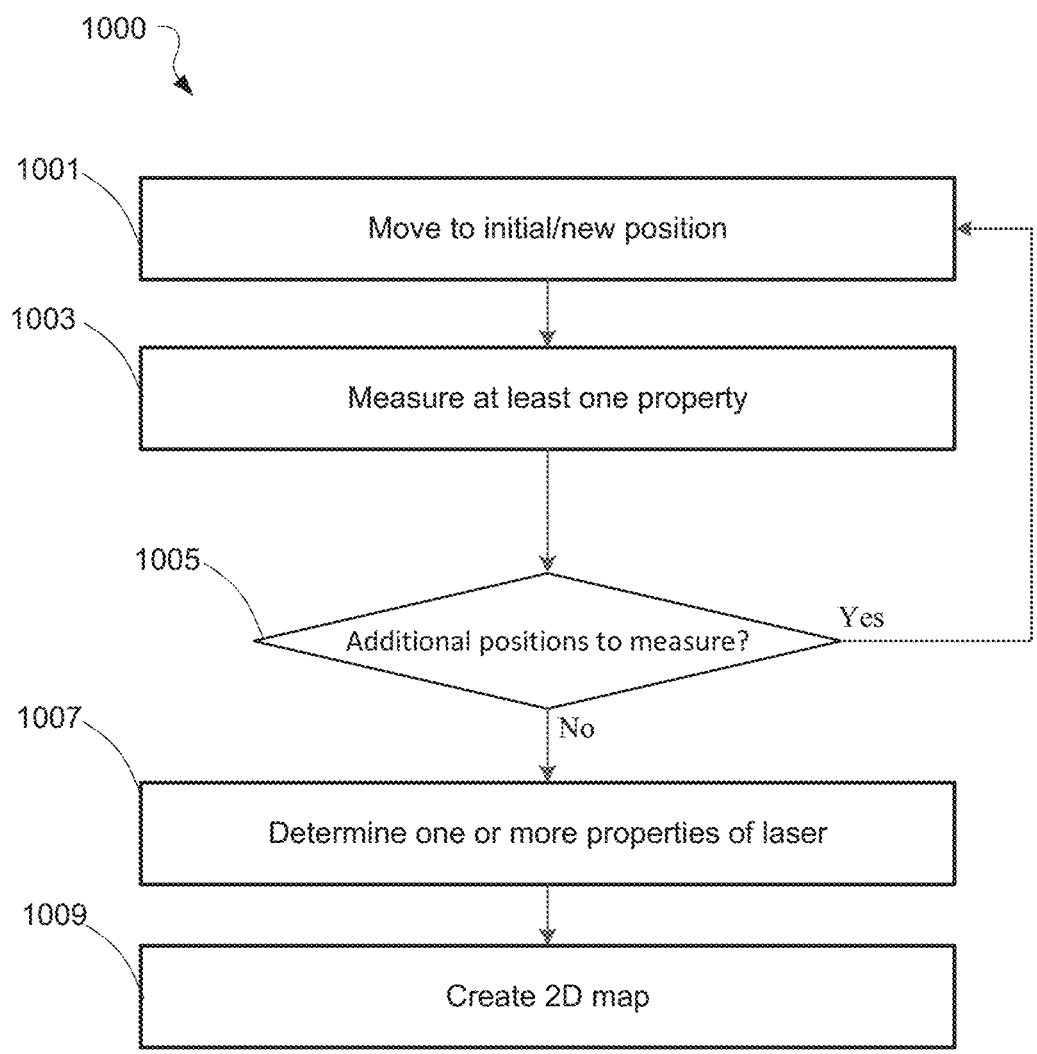
FIG. 10 is a flow chart of a method of characterizing an optical element, according to some embodiments.

Referring to FIG. 10, a method 1000 of characterizing an optical element, such as a SAM, is illustrated. At block 1001, a controller (e.g., controller 150 of FIG. 1) moves the SAM to an initial position using the two-dimensional translation stage (e.g., stage 145 of FIG. 1). At block 1003, the controller (e.g., controller 150 of FIG. 1) measures at least one property of the laser beam using the optical detection system. At block 1005, the controller determines whether there are additional portions of the SAM to be measured. If yes, then the method 1000 returns to block 1001 where the controller uses the translation stage to adjust the position of the SAM relative to the illumination spot of the laser beam. If there are no additional positions to measure, the method 1000 continues to block 1007 where the controller determines one or more properties of the laser beam. At block 1009, the controller creates a two-dimensional map of the SAM based on the one or more properties of the laser beam. Embodiments of the method 1000 are not limited to the order of actions presented in FIG. 10. For example, some embodiments may perform block 1007 (determine one or more properties of the laser) at the time that each property is measured, before the block 1005.

In some embodiments, more than one property can be measured in a given scan. There are different approaches for measuring the different properties. In some implementations, multiple measurements may be made at each position of the scan. Alternatively, a first scan can be completed for a first measurement followed by a second scan for a second measurement. Each scan need not have the same number of positions or the same "resolution," the resolution of a scan being determined by the step size of the translation stage on which the SAM is mounted.

As mentioned earlier, the optical detection system may detect a number of properties of the pulsed laser, including pulse width, a power associated with each emitted wavelength, and/or a fast photodiode signal. These quantities, measured in block 1003, can be used to determine additional properties of the laser that relate to the quality of the SAM. But some properties are useful to characterize the SAM with no additional analysis. For example, in a laser system that emits both light pulses at 532 nm and light pulses at 1064 nm, the power of each beam of light pulses may be important to the performance of the laser system. For example, a laser system using a SAM may be expected to produce a certain power of light at 532 nm. Thus, mapping the power of the light at 532 nm across the face of the SAM is an important characterization to perform.

Similarly the temporal pulse width of the laser pulses as measured by the pulse characterization detector 345 is a useful characteristic of the laser system to measure by scanning the face of the SAM. In some embodiments, the autocorrelator signal is fit to a $sech^2$ curve, the FWHM of which is used as the temporal pulse duration.

A first property that can be derived from the measured quantities is whether the pulsed laser is continuous wave (CW), passively mode-locking (ML) or Q-switching (QS). The manufacturer of a laser system wants to ensure the laser is mode-locked, not Q-switching. Certain SAMs are prone to Q-switching, so mapping the mode-locking capability across the surface of the SAM is a helpful measurement in determining whether the SAM should be used in a manufactured laser system. One technique for determining whether the laser is CW, mode-locking or Q-switching is based on the signal from the fast photodiode. When a laser is CW, the fast photodiode signal contains no pulses. When a laser is mode-locked, the fast photodiode signal contains regularly spaced pulses with approximately constant intensity. When a laser is Q-switching, the fast photodiode signal contains pulses that fluctuate in intensity on a relative short time scale. Thus, the fast photodiode signal may be analyzed to determine which of these three operational conditions are present for a given set of operational parameters.

A second property that can be derived from the measured quantities is a damage threshold. Because measuring the damage threshold requires permanently damaging the SAM, a map of a damage threshold may not be formed. Instead, the damage threshold may be tested at a few positions around the periphery of the SAM. One technique for measuring the damage threshold is based on the power of the light pulses at 532 nm. The pump current may be increased, which prior to reaching the damage threshold will result in an increase in power of the light at 532 nm. When the damage threshold is reached, a sudden drop of optical power at 532 nm will result. Accordingly, determining the damage threshold may include analyzing the signal from the power meter monitoring the power of the light at 532 nm for a drop in power.

A third property that can be derived from the measured quantities is a longevity of the SAM. The inventors have realized that a SAM of poor quality and short longevity may spontaneously change from mode-locking to Q-switching after running for a certain period of time. For example, after about 24-72 hours of continuous operation, a laser using a poor quality SAM may spontaneously begin Q-switching. Thus, monitoring the fast photodiode signal for signs of Q-switching may be used to determine the longevity of the SAM. Alternatively or additionally, the power of the light pulses generated may be used to determine longevity. The inventors have recognized that when a laser is operated for a period of about 24-72 hours, the power of the light pulses at 532 nm and/or 1064 nm may drop-off and the rate of the power drop-off is related to the longevity of the SAM. Accordingly, if the power drops off at a rate that is greater than a particular threshold rate, the SAM may be considered poor quality. Because the longevity measurement is very slow (e.g., it takes 24-72 hours) a scan of the SAM may be performed. Instead a signal measurement of the SAM may be used to characterize the entire SAM.

A fourth property that can be derived from the measure quantities is a mode-locking pump threshold, also referred to as a mode-locking current threshold. This property is the minimal value of the electrical current of the laser pump at which the laser system will passively mode-lock. There are a variety of techniques that may be used to determine the mode-locking pump threshold. In some embodiments, to reduce the time it takes to make the determination (particularly the worst-case time), the mode-locking pump threshold is determined using a binary search strategy, which is described in connection with FIG. 11. Embodiments are not limited to this approach. Another approach is to start at the minimum possible pump current and increment the current by a step size until the laser mode-locks. This type of approach, however, is more time consuming than the binary search approach.

Figure 11:
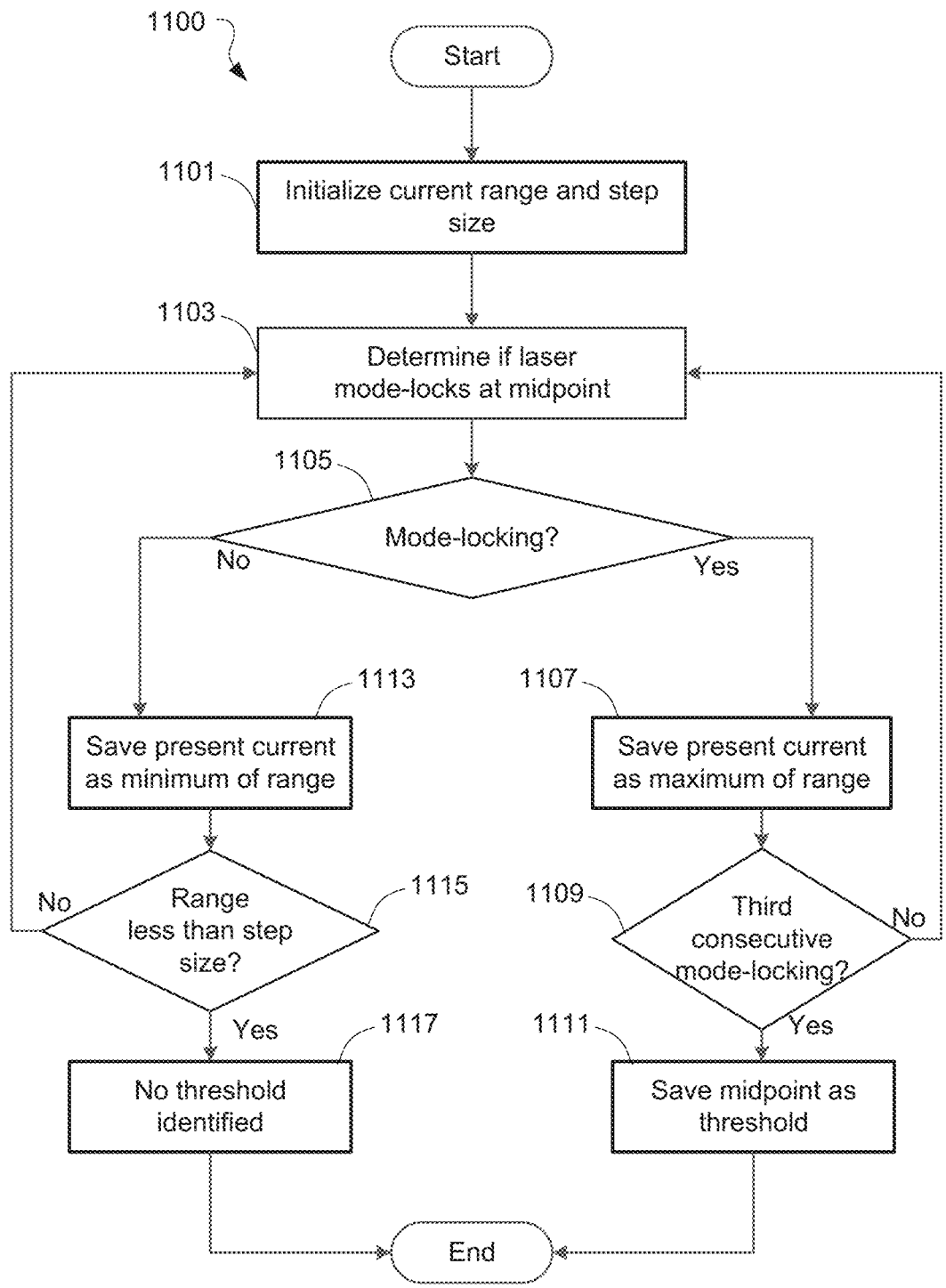
FIG. 11 is a flow chart of a method for determining a mode-locking pump threshold, according to some embodiments.

FIG. 11 is a flow chart of a method 1100 of determining the mode-locking pump threshold for the optical characterization apparatus with a particular SAM. At block 1101, the controller 150 initializes a current range and step size for the binary search. The initial current range may be defined by a predetermined minimum pump current and a predetermined maximum pump current. The initial maximum pump current may, for example, be one or two steps below the maximum current that the pump is capable of producing.

At block 1103, the controller sets the pump current to be at the midpoint of the current range and determines if the laser is mode-locked. The controller may determine if the laser is mode-locked using the fast photodiode signal, as discussed above. Alternatively the signal from the pulse characterization detector may be used to determine if the laser is mode-locked.

At block 1105, the method 1100 continues to block 1113 if the controller determines, at block 1103, that the laser is not mode-locking at the midpoint current value. At block 1113, the controller saves the present midpoint value as the new minimum pump current of the range. The method 1100 then continues to block 1115 where the controller determines whether the new range is less than the step size. If yes, then the controller 150 determines that no mode-locking pump threshold can be found and the method 1100 ends. If no, then the controller 150 returns to block 1103.

At block 1105, the method 1100 continues to block 1107 if the controller determines, at block 1105, that the laser is mode-locking at the midpoint current value. At block 1107, the controller saves the present midpoint value as the new maximum pump current of the range. The method 1100 then continues to block 1109 where the controller determines whether this is the third consecutive time that the laser was determined to be mode-locking at block 1103. If yes, then the controller 150 saves the present midpoint value as the mode-locking pump threshold value and the method 1100 ends. If no, then the controller 150 returns to block 1103. The method 1100 makes the determination of block 1109 in order to avoid spurious detection of mode-locking, which may occur below the actual mode-locking threshold.

In some embodiments, not all of the above-mentioned properties are determined when performing a characterization of an optical element. Any subset of properties may be determined for any given characterization routine.

Figure 12:
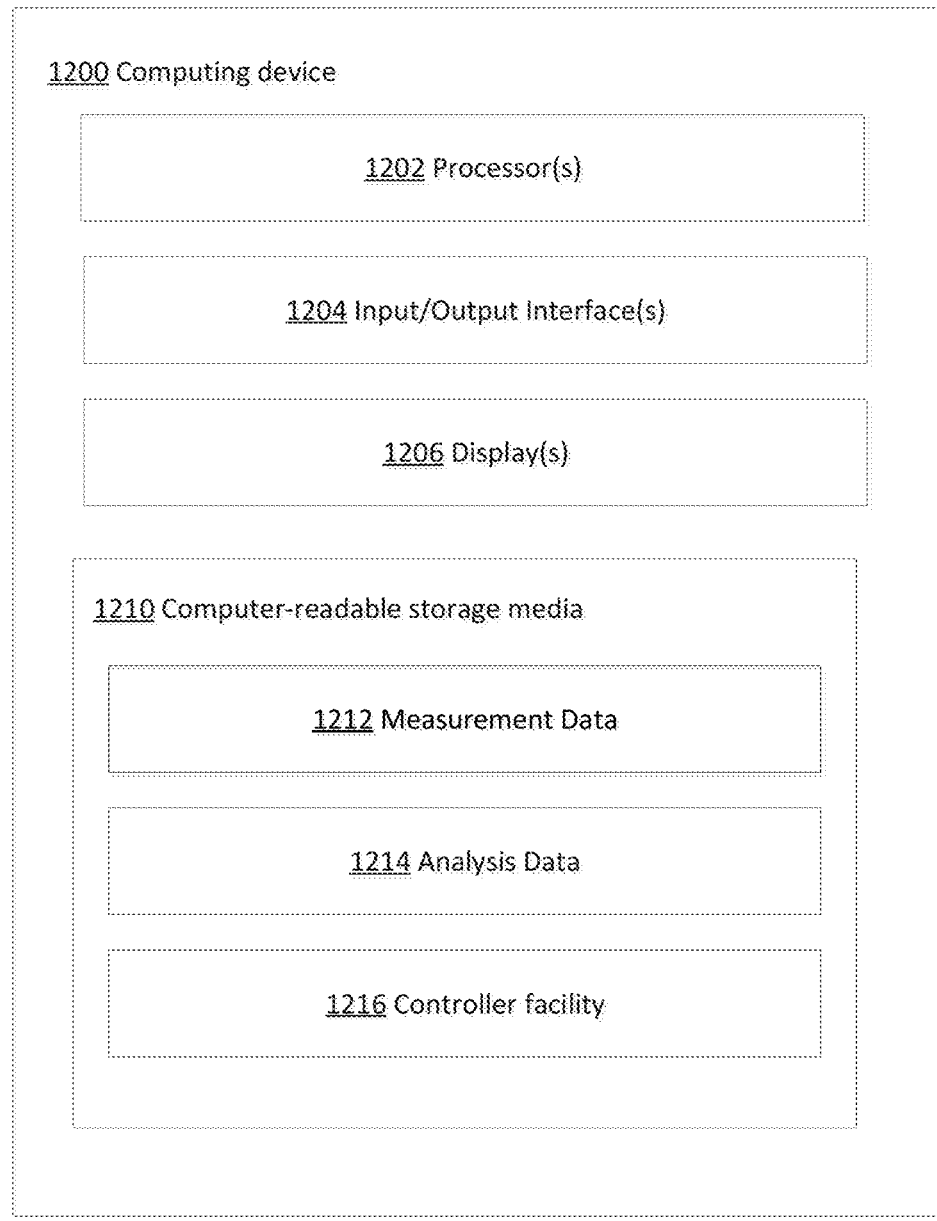
FIG. 12 is a computing device, according to some embodiments.

The controller 150 of FIG. 1 may be implemented using a computing device. FIG. 12 illustrates one example implementation of a computing device in the form of a computing device 1200 that may be used in a system implementing techniques described herein, although others are possible. Computing device 1200 may, for example, be implemented as the controller 150 in FIG. 1. It should be appreciated that FIG. 12 is intended neither to be a depiction of necessary components for a computing device to operate as a controller or any other computing device of a system operating according to techniques described herein, nor a comprehensive depiction.

Computing device 1200 may comprise at least one processor 1202, at least one input/output interface 1204, a display 1206, and computer-readable storage media 1210. Computing device 1200 may be, for example, a wearable device, a desktop or laptop personal computer, a personal digital assistant (PDA), a smart mobile phone, a tablet computer, a server, or any other suitable computing device. Input/output interface(s) 1204 may be any suitable hardware and/or software to enable the computing device 1200 to communicate wired and/or wirelessly with the translation stage and/or the components of the optical detection system. The input/output interface(s) 1204 may include a network interface to communicate with wireless access points, switches, routers, gateways, and/or other networking equipment as well as any suitable wired and/or wireless communication medium or media for exchanging data between two or more computers, including the Internet. Computer-readable media 1210 may be adapted to store data to be processed and/or instructions to be executed by processor 1202. Processor 1202 enables processing of data and execution of instructions. The data and instructions may be stored on the computer-readable storage media 1210 and may, for example, enable communication between components of the computing device 1200.

Device 1200 may, in some embodiments, include a display 1206 for presenting two-dimensional maps of the surface of the optical component to a user of the device 1200.

The data and instructions stored on computer-readable storage media 1210 may comprise computer-executable instructions implementing techniques which operate according to the principles described herein. In the example of FIG. 12, computer-readable storage media 1210 stores computer-executable described instructions implementing a controller facility 1216 and storing various information, such as measurement data 1212 from the optical detection system and analysis data 1214 resulting from analyzing the measurement data 1212. The media 612 may additionally store instructions for a controller facility 1216, which may implement any of the techniques described above for controlling the optical characterization apparatus 100.

While not illustrated in FIG. 12, a computing device 1200 may additionally have one or more components and peripherals, including a user interface to allow a user to interact with the controlling device 1200 and provide input to the device 1200. Such devices may include as keyboards and pointing devices, such as mice, touch pads, and digitizing tablets.

As another example, a computing device may receive input information through speech recognition or in other audible format.

Example Results

Figures 13A, 13B, 13C:
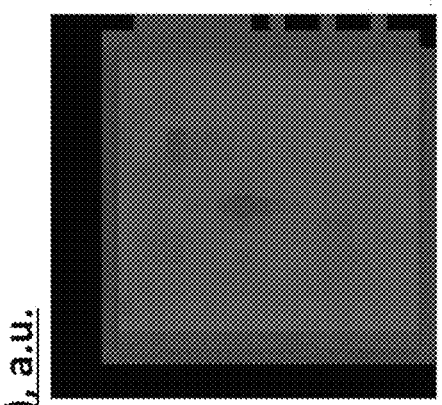
FIG. 13A is an example power map, according to some embodiments.
FIG. 13B is example pulse width data, according to some embodiments.
FIG. 13C is an example pulse width map, according to some embodiments.

FIGS. 13A-C illustrate example results obtained by mapping the output power of the light pulses at 532 nm and the pulse width using the optical characterization apparatus 100 for a two by two (2×2) millimeter SAM with a 100 micrometer scanning step size. FIG. 13A shows the output power at 532 nm across the face of the SAM. As can be seen, the edges exhibit low power. Additionally, there is a location near the center of the SAM that also exhibits low power (indicated by the dashed circle of FIG. 13A). This may be an indication of a defect in the SAM. In this case, the defect appears small enough that the SAM may be used in a laser system, but the SAM should be arranged such that the illumination spot of the laser beam is at a different location from the defect. FIG. 13B shows an autocorrelator measurement result for a single location on the SAM. The FWHM of the $\text{sech}^2$ fit is used as the pulse width. FIG. 13C is a map of the pulse width for all of the locations across the face of the SAM. At the same location where the power map of FIG. 13A indicates a possible defect, the pulse width of the laser of the optical characterization apparatus is significantly increased relative to other portions of the SAM. The two maps of FIGS. 13A and 13C together may be used to determine how to best position the SAM within a laser cavity, or whether to use the SAM at all if it is of insufficient quality.

Figure 14A:
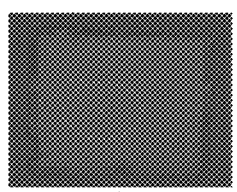
FIG. 14A is example power, according to some embodiments.
Figure 14D:
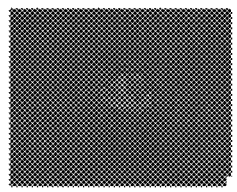
FIG. 14D is an example power map, according to some embodiments.
Figure 14B:
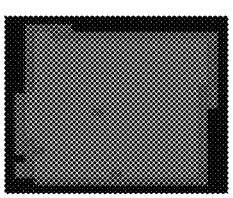
FIG. 14B is an example lasing regime map, according to some embodiments.
Figure 14E:
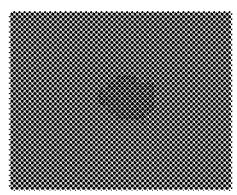
FIG. 14E is an example lasing regime map, according to some embodiments.
Figure 14C:
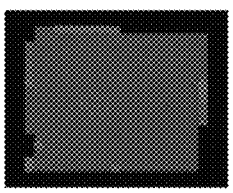
FIG. 14C is an example pulse width map, according to some embodiments.
Figure 14F:
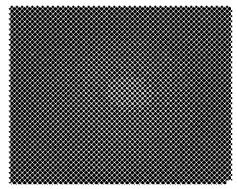
FIG. 14F is an example pulse width map, according to some embodiments.

FIGS. 14A-F illustrate example results from a different SAM using the optical characterization apparatus. FIG. 14A is a map of the power of the 532 nm laser pulses with 100 micrometer step size; FIG. 14B is a map of the lasing regime (i.e., CW (Off), Q-switching (QS), or mode-locking (ML)) with a 100 micrometer step size; FIG. 14C is a map of the pulse width with a 100 micrometer step size. Again, the edges of the SAM do not provide adequate power, mode-locking or pulse width. Additionally, there is a defect near the center of the SAM, as indicated by the laser Q-switching at that location and the pulse width being significantly larger than other locations on the face of the SAM. FIGS. 14D-F are maps that zoom in on the defect using a smaller step size of 25 micrometers. FIG. 14D is a map of the power of the 532 nm laser pulse width in the vicinity of the defect; FIG. 14E is a map of the lasing regime in the vicinity of the defect; FIG. 14F is a map of the pulse width in the vicinity of the defect.

Figure 15A:
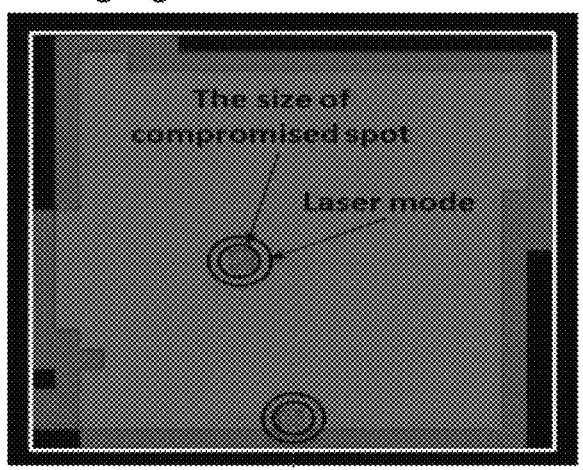
FIG. 15A is an example lasing regime map, according to some embodiments.
Figure 15B:
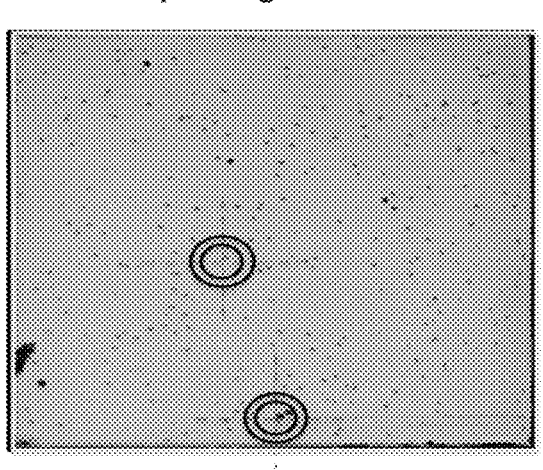
FIG. 15B is an optical microscope image for comparison with the lasing regime map of FIG. 15A.

The inventors investigated the locations of the SAM where the lasing regime indicates the presence of a defect (see FIG. 15A) by visually inspecting the SAM using an optical microscope (see FIG. 15B). There are not defects visible on the SAM at the locations of the defects. Accordingly, the inventors have recognized and appreciated that characterization techniques of some embodiments are capable of detecting defects in optical components, such as SAMs, that are not detectable using conventional techniques such as visual inspection. In some embodiments, the optical characterization apparatus is capable of probing nonlinear characteristics of an optical element, which an optical microscope cannot do. Additionally, the optical characterization apparatus can probe an optical element with an intracavity laser beam, which conventional inspection techniques such as optical microscopy cannot do.

Other Considerations

Having thus described several aspects of several embodiments of an optical characterization apparatus, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

For example, embodiments may be modified to include more or fewer optical components in a laser cavity than described above. Moreover, laser cavity configurations may differ from those shown with some laser cavities have more or fewer turns or folds in the optical path. Additionally, while embodiments have been described that mounting an end mirror and/or SAM on a translation stage, other optical elements that are not at the end of the laser cavity may be mounted on a translation stage to be characterized. In this way, optical elements may be positioned to receive an intracavity laser beam for purposes of characterizing the optical element.

While various inventive embodiments have been described and illustrated, those of ordinary skill in the art will readily envision a variety of other means and/or structures for performing the function and/or obtaining the results and/or one or more of the advantages described, and each of such variations and/or modifications is deemed to be within the scope of the inventive embodiments described. More generally, those skilled in the art will readily appreciate that all parameters, dimensions, materials, and configurations described are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure may be directed to each individual feature, system, system upgrade, and/or method described. In addition, any combination of two or more such features, systems, and/or methods, if such features, systems, system upgrade, and/or methods are not mutually inconsistent, is included within the inventive scope of the present disclosure.

Further, though some advantages of certain embodiments may be indicated, it should be appreciated that not every embodiment will include every described advantage. Some embodiments may not implement any features described as advantageous. Accordingly, the foregoing description and drawings are by way of example only.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used are for organizational purposes only and are not to be construed as limiting the subject matter described in any way.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

The term "optical" may be used to refer to ultraviolet, visible, near infrared, and short-wavelength infrared spectral bands.

The phrase "characteristic wavelength" or "wavelength" may be used to refer to a central or predominant wavelength within a limited bandwidth of radiation. In some cases, it may refer to a peak wavelength within a bandwidth of radiation.

The phrase "characteristic energy" or "energy" may be used to refer to an energy associated with a characteristic wavelength.

The terms "about," "approximately," and "substantially" may be used in reference to a value, and are intended to encompass the referenced value plus and minus reasonable variations. The amount of variation could be less than 5% in some embodiments, less than 10% in some embodiments, and yet less than 20% in some embodiments. In embodiments where an apparatus may function properly over a large range of values, e.g., a range including one or more orders of magnitude, the amount of variation could be a factor of two. For example, if an apparatus functions properly for a value ranging from 20 to 350, "approximately 80" may encompass values between 40 and 160.

The term "adjacent" may be used to refer to two elements arranged within close proximity to one another (e.g., within a distance that is less than about one-fifth of a transverse or vertical dimension of a larger of the two elements). In some cases there may be intervening structures or layers between adjacent elements. In some cases adjacent elements may be immediately adjacent to one another with no intervening structures or elements.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:
1. An optical characterization apparatus comprising:
a laser system comprising:
a laser that generates a laser beam; and
a laser cavity having a first mirror and a second mirror that receive and direct the laser beam in a third direction; and
an optical detection system comprising:
a two-dimensional translation stage configured to translate the second mirror in a first direction and second direction substantially perpendicular to the third direction; and
a controller, coupled to the optical detection system and the two-dimensional translation stage, that
controls operation of the two-dimensional translation stage based on a detected at least one property of the laser beam;
wherein the optical detection system receives from the laser system the laser beam and detects the at least one property of the laser beam and characterizes performance of the second mirror therefrom;
wherein the first mirror is an output coupler configured to emit at least a portion of the laser beam from the laser cavity and wherein the second mirror is a saturable absorber mirror and the performance characterized includes at least one of mode-locking performance and optical power.

2. The optical characterization apparatus of claim 1, wherein the laser further comprises a plurality of intra-cavity mirrors that further define the laser cavity.

3. The optical characterization apparatus of claim 2, wherein a first intra-cavity mirror of the plurality of intra-cavity mirrors is configured to reflect light of a first polarization type different than light of a second polarization type, and the other intra-cavity mirrors of the plurality of intra-cavity mirrors are configured to reflect light of the second polarization type different than light of the first polarization type.

4. The optical characterization apparatus of claim 3, wherein:
the laser beam propagates in a first plane between the first mirror and the first intra-cavity mirror; and
the laser beam propagates in the third direction that is not in the first plane.

5. The optical characterization apparatus of claim 1, wherein the optical detection system comprises a power meter.

6. The optical characterization apparatus of claim 1, wherein the optical detection system comprises a fast photodiode.

7. The optical characterization apparatus of claim 1, wherein the optical detection system comprises a pulse characterization detector.

8. The optical characterization apparatus of claim 7, wherein the pulse characterization detector comprises an autocorrelator.

9. The optical characterization apparatus of claim 1, wherein the controller is further configured to receive a measurement result from at least one detector for each of a plurality of portions of the second mirror.

10. The optical characterization apparatus of claim 9, wherein the measurement result is one or more of a fast photodiode signal, a temporal pulse width and an optical power measurement.

11. The optical characterization apparatus of claim 9, wherein the controller is further configured to determine a mode-locking current threshold.

12. The optical characterization apparatus of claim 11, wherein the controller is further configured to determine a mode-locking current threshold based on a fast photodiode signal.

13. The optical characterization apparatus of claim 11, wherein the controller is configured to determine the mode-locking current threshold using a binary search.

14. The optical characterization apparatus of claim 9, wherein the controller is configured to determine a damage threshold of the optical characterization apparatus.

15. The optical characterization apparatus of any of claim 14, wherein the controller is configured to determine the damage threshold based on an optical power measurement.

16. The optical characterization apparatus of claim 9, wherein the controller is configured to determine a longevity of the optical characterization apparatus.

17. The optical characterization apparatus of claim 16, wherein the controller is configured to determine the longevity based on an optical power measurement.

18. The optical characterization apparatus of claim 9, wherein the controller is further configured to create a two-dimensional map of one or more properties of the second mirror.

19. The optical characterization apparatus of claim 1, further comprising:
a housing comprising a base plate, wherein:
the first mirror is mounted on the base plate within the housing; and
the second mirror is positioned outside of the housing.

20. The optical characterization apparatus of claim 1, wherein the second mirror is a saturable absorber mirror (SAM).

21. The optical characterization apparatus of claim 1, further comprising a gain medium positioned between the first mirror and the second mirror in a path of the laser beam.

22. The optical characterization apparatus of claim 1, wherein the second mirror is an end mirror of the laser cavity.

23. The optical characterization apparatus of claim 22, wherein the intracavity laser beam probes an optical characteristic of the optical element that is substantially not visible with optical microscopy.

24. The optical characterization apparatus of claim 22, wherein the optical element defines a laser cavity of the laser.

25. The optical characterization apparatus of claim 22, wherein the optical element is an end mirror of the laser.

26. An optical characterization apparatus comprising:
a laser system configured to generate an intracavity laser beam having a beam axis;
a positioning mount arranged to hold an optical element so that the optical element receives the intracavity laser beam and can move the optical element substantially transverse to the beam axis;
an optical detection system that receives from the laser the laser beam and detects at least one property of the laser beam and characterizes therefrom performance of the optical element as it functions within the laser system; and
a controller, coupled to the optical detection system and positioning mount, that controls operation of the positioning mount based on the detected at least one property of the laser beam;
wherein the first mirror is an output coupler configured to emit at least a portion of the laser beam from the laser cavity and wherein the second mirror is a saturable absorber mirror and the performance characterized includes at least one of mode-locking performance and optical power.

27. The optical characterization apparatus of claim 26, wherein the intracavity laser beam probes a nonlinear characteristic of the optical element.

28. A method of characterizing an optical element, the method comprising:
scanning the optical element substantially transverse to an intracavity beam of a laser system; and
determining a performance characteristic of the optical element as a function of a measured property of the laser beam; and
controlling movement of the optical element based on the determination;
wherein the optical element is saturable absorber and the performance characterized includes at least one of mode-locking repetition rate, pump threshold, quality, and power expended.

29. The method of claim 28, further comprising providing display information that maps values of the performance characteristic to locations on the optical element.

30. The method of claim 28, wherein the performance characteristic is associated with an optically nonlinear property of the optical element.

31. The method of any of claim 28, wherein the performance characteristic is associated with an optical property of the optical element that is substantially not visible with optical microscopy.

32. The method of claim 28, wherein the optical element defines a laser cavity of the laser.

33. The method of claim 28, wherein the optical element is an end mirror of the laser.

34. The method of claim 28, wherein the optical element is saturable absorber.

35. The method of claim 28, wherein the performance characteristic comprises an optical power of the laser.

36. The method of claim 28, wherein the performance characteristic comprises a temporal pulse width of the laser.

37. The method of claim 28, wherein the performance characteristic comprises a mode-locking pump threshold.

38. The method of claim 37, further comprising determining the mode-locking pump threshold using a binary search.

39. The method of claim 38, wherein determining the mode-locking pump threshold using a binary search comprises:
defining a pump current range; and
pumping the laser using a current substantially equal to a midpoint of the pump current range.

* * * * *